(12) United States Patent
Silverstein et al.

(10) Patent No.: US 12,573,367 B2
(45) Date of Patent: Mar. 10, 2026

(54) TEXT TO AUDIO CONVERSION WITH STYLE CONDITIONING

(71) Applicant: Naro Corp., West Bloomfield, MI (US)

(72) Inventors: Todd Silverstein, Tokyo (JP); Max Florian Frenzel, Tokyo (JP); Lyle Patrick Stein, Toronto (CA)

(73) Assignee: Naro Corp., West Bloomfield, MI (US)

( * ) Notice: Subject to any disclaimer, the term of this patent is extended or adjusted under 35 U.S.C. 154(b) by 221 days.

(21) Appl. No.: 18/233,294

(22) Filed: Aug. 11, 2023

(65) Prior Publication Data

US 2025/0054487 A1     Feb. 13, 2025

(51) Int. Cl.
| | |
|---|---|
| *G10L 13/02* | (2013.01) |
| *G06N 3/045* | (2023.01) |
| *G10L 13/033* | (2013.01) |
| *G10L 25/48* | (2013.01) |

(52) U.S. Cl.
CPC ............. *G10L 13/02* (2013.01); *G06N 3/045* (2023.01); *G10L 13/033* (2013.01); *G10L 25/48* (2013.01)

(58) Field of Classification Search
None
See application file for complete search history.

(56) References Cited

U.S. PATENT DOCUMENTS

| | | | | |
|---|---|---|---|---|
| 11,776,518 B2 * | 10/2023 | Silverstein | ............. | G06N 20/00 84/600 |
| 11,830,476 B1 * | 11/2023 | Karanasou | ........... | G06N 3/0455 |

| | | | | |
|---|---|---|---|---|
| 12,027,151 B2 * | 7/2024 | Pang | .................... | G06N 3/0464 |
| 12,443,879 B2 * | 10/2025 | Giovannini | .......... | G06N 3/0455 |
| 2021/0026821 A1 * | 1/2021 | Glidden | .............. | H04L 63/0414 |
| 2021/0125592 A1 * | 4/2021 | Rein | .................... | G10H 1/0025 |
| 2021/0256960 A1 * | 8/2021 | Daido | .................... | G10H 7/002 |
| 2023/0081659 A1 * | 3/2023 | Pan | ........................ | G10L 13/033 704/259 |
| 2023/0104417 A1 * | 4/2023 | Vechtomova | ........ | G10H 1/0008 704/9 |
| 2023/0186895 A1 * | 6/2023 | Kim | ..................... | G10L 13/027 704/260 |

(Continued)

OTHER PUBLICATIONS

Yuxuan Wang, Daisy Stanton, Yu Zhang, RJ Skerry-Ryan, Eric Battenberg, Joel Shor, Ying Xiao, Fei Ren, Ye Jia, Rif A. Saurous; Style Tokens: Unsupervised Style Modeling, Control and Transfer in End-to-End Speech Synthesis; Mar. 23, 2018 URL:https://arxiv.org/pdf/1803.09017 (Year: 2018).*

(Continued)

*Primary Examiner* — Richa Sonifrank
(74) *Attorney, Agent, or Firm* — Cognition IP, P.C.; Edward Steakley; Saleh Kaihani

(57) ABSTRACT

A style encoder can be trained to encode audio style and audio characteristics into selected regions of a style vector. The style vector can be used to condition a text to speech (TTS) model to generate speech with human-understandable and controllable styles. Various training strategies of the style encoder are described, including a first, second and third training strategy that can be used to disentangle audio styles into selected regions of a style vector. The distinct regions of the style vector can be used to provide numerous customization options to a user of the described system, along with tools to generate speech with a speaker identity and using selected audio styles and characteristics.

18 Claims, 16 Drawing Sheets

(56)            References Cited

U.S. PATENT DOCUMENTS

| | | | | |
|---|---|---|---|---|
| 2023/0186919 | A1* | 6/2023 | Ye | G10L 15/065 |
| | | | | 704/231 |
| 2024/0105160 | A1* | 3/2024 | Kim | G10L 13/047 |
| 2024/0256928 | A1* | 8/2024 | Kim | G06N 3/04 |
| 2024/0311583 | A1* | 9/2024 | Russi-Vigoya | G06F 40/42 |
| 2024/0404126 | A1* | 12/2024 | Park | G06N 3/084 |
| 2024/0412749 | A1* | 12/2024 | Liao | G10L 17/04 |
| 2024/0428002 | A1* | 12/2024 | Elangovan | G06F 40/30 |
| 2025/0078841 | A1* | 3/2025 | Wu | G10L 17/04 |

OTHER PUBLICATIONS

Li, Wan, et al.,"Generalized End-to-End Loss for Speaker Verification", Google Inc., USA; Nov. 9, 2020; https://arxiv.org/pdf/1710.10467.pdf.
Sun Chung, Joon, et al., "In defence of metric learning for speaker recognition", Naver Corporation, South Korea; Apr. 24, 2020; https://arxiv.org/pdf/2003.11982.pdf.
Yuan, Siyang, et al., I"mproving Zero-Shot Voice Style Transfer via Disentangled Representation Learning," ICLR 2021, Nov. 17, 2021; https://arxiv.org/pdf/2103.09420.pdf.

* cited by examiner

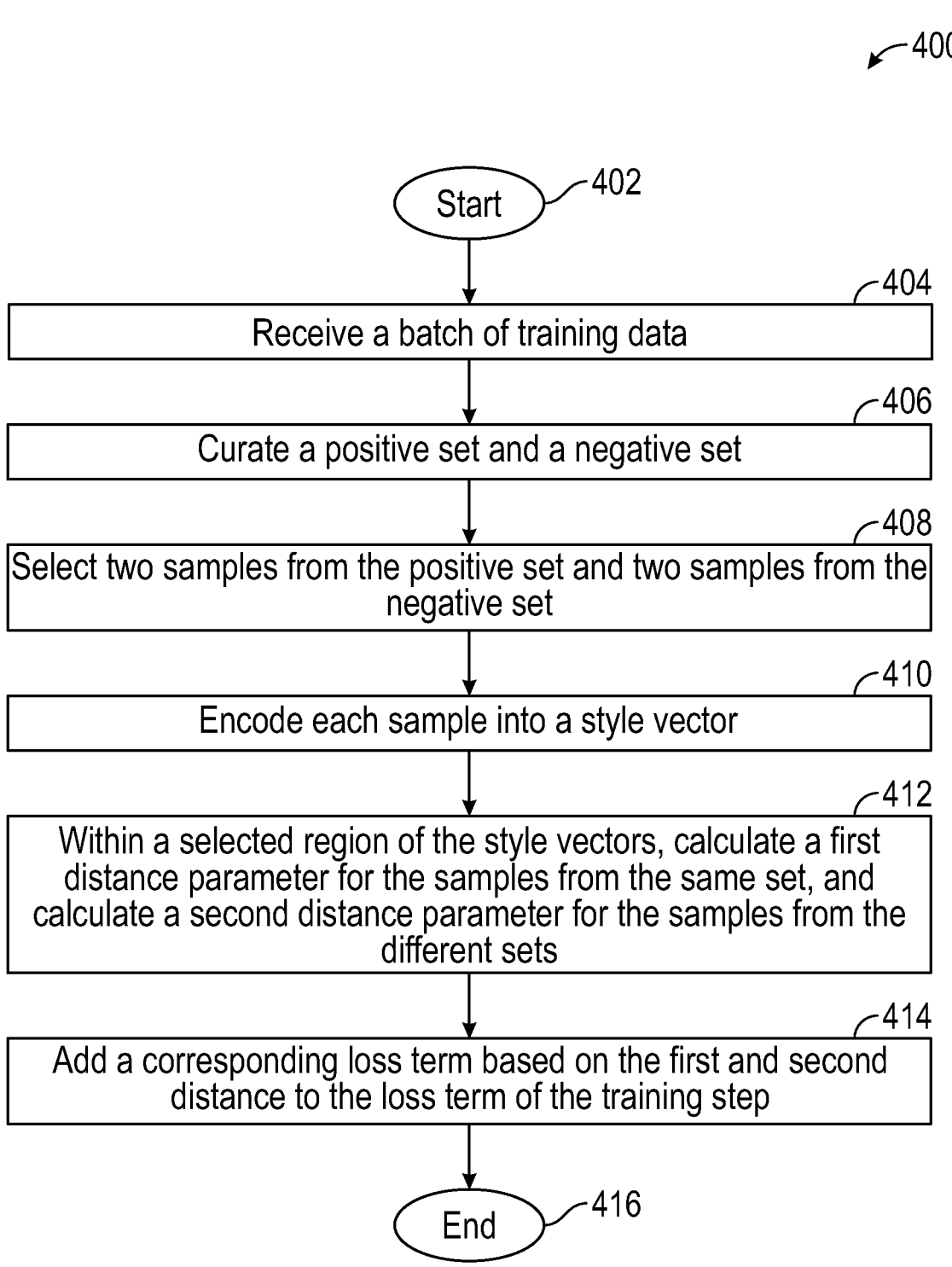

400

Start ⟋402

Receive a batch of training data ⟋404

Curate a positive set and a negative set ⟋406

Select two samples from the positive set and two samples from the negative set ⟋408

Encode each sample into a style vector ⟋410

Within a selected region of the style vectors, calculate a first distance parameter for the samples from the same set, and calculate a second distance parameter for the samples from the different sets ⟋412

Add a corresponding loss term based on the first and second distance to the loss term of the training step ⟋414

End ⟋416

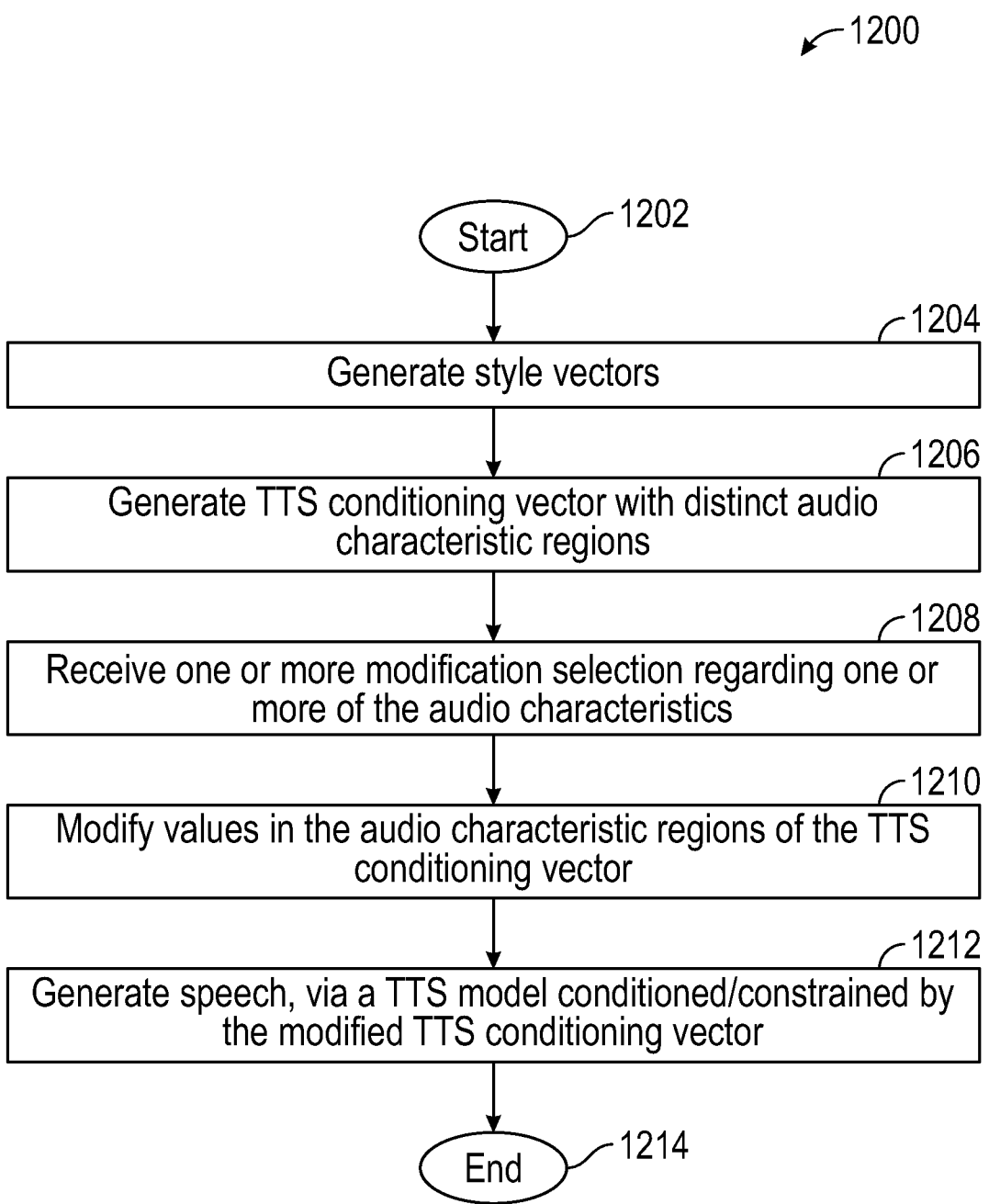

1200

Start — 1202

1204
Generate style vectors

1206
Generate TTS conditioning vector with distinct audio characteristic regions 1208
Receive one or more modification selection regarding one or more of the audio characteristics 1210
Modify values in the audio characteristic regions of the TTS conditioning vector 1212
Generate speech, via a TTS model conditioned/constrained by the modified TTS conditioning vector End — 1214

FIG. 12

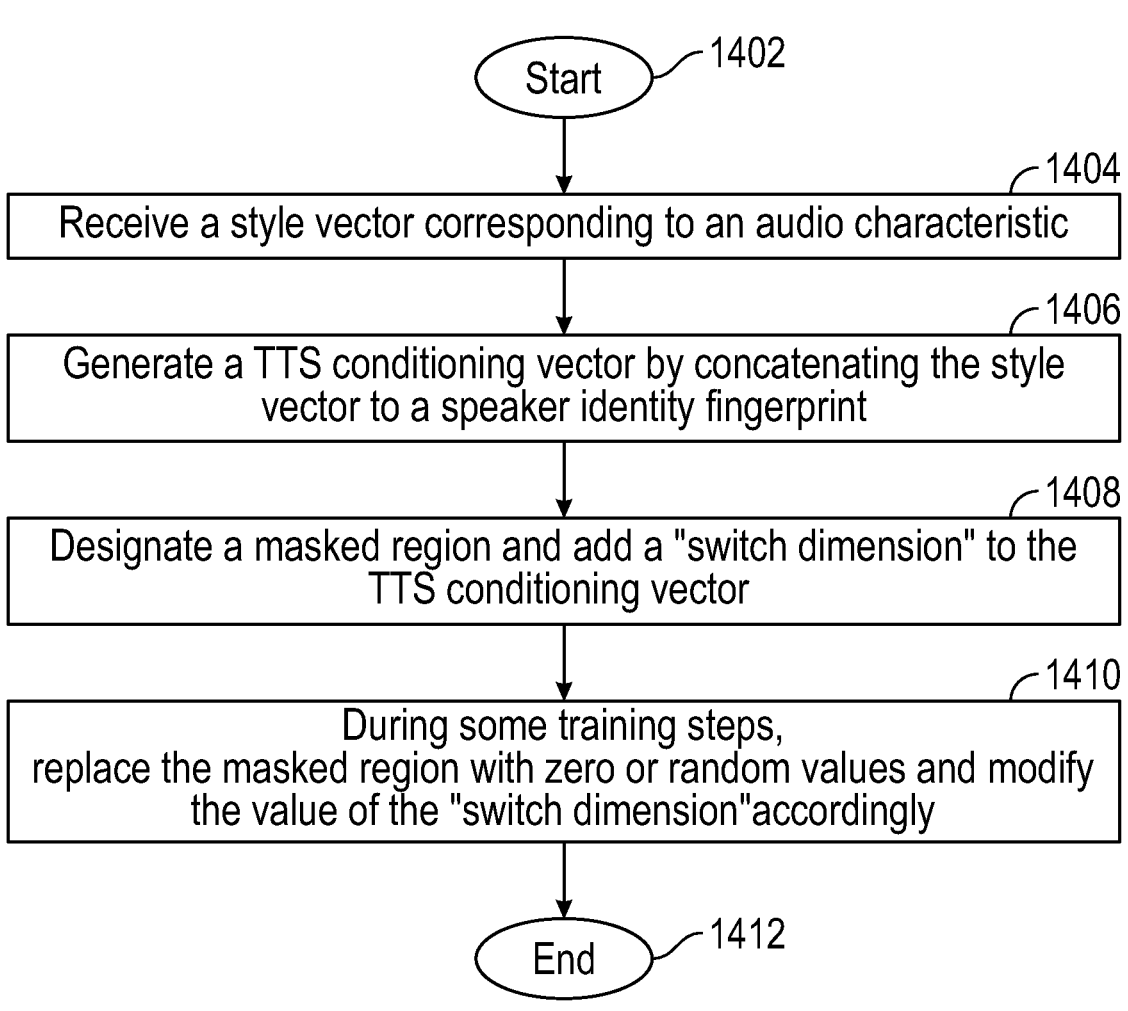

1400

1402
Start

1404
Receive a style vector corresponding to an audio characteristic

1406
Generate a TTS conditioning vector by concatenating the style vector to a speaker identity fingerprint 1408
Designate a masked region and add a "switch dimension" to the TTS conditioning vector 1410
During some training steps,
replace the masked region with zero or random values and modify the value of the "switch dimension"accordingly 1412
End

FIG. 14

TEXT TO AUDIO CONVERSION WITH STYLE CONDITIONING

BACKGROUND

Field

This invention relates generally to artificial intelligence, and more particularly to training and using artificial intelligence models for generating speech.

Description of the Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Artificial intelligence (AI) models can be used to generate artificial speech that to a human listener sounds as if the speech were spoken by a human being. Applications of AI generated speech are numerous. For example, the field of audio or sound engineering can benefit substantially from tools that can enable generating artificial speech. In particular, tools that can provide human-understandable and human controllable audio characteristics can make audio production pipelines more efficient. For example, audio can be edited, similar to how text is edited, where sections can be removed, and new sections can be added. Human understandability and controllability of generated audio characteristics can provide substantial efficiencies for various industries, including for example, audio processing pipelines in the entertainment industry.

SUMMARY

The appended claims may serve as a summary of this application. Further areas of applicability of the present disclosure will become apparent from the detailed description, the claims, and the drawings. The detailed description and specific examples are intended for illustration only and are not intended to limit the scope of the disclosure.

BRIEF DESCRIPTION OF THE DRAWINGS

These drawings and the associated description herein are provided to illustrate specific embodiments of the invention and are not intended to be limiting.

FIG. 4 illustrates a flowchart of a method, where the first style disentanglement strategy is implemented.

FIG. 9 illustrates a diagram of the training objective of a style encoder, and the treatment of various loss terms in relation to the first, second and third strategies.

FIG. 12 illustrates a flowchart of an example method for generating speech with a modified conditioning vector.

FIG. 14 illustrates a flowchart of an example training method of a text to speech (TTS) model, when the "switch dimensions" feature is used.

DETAILED DESCRIPTION

Figure 1:
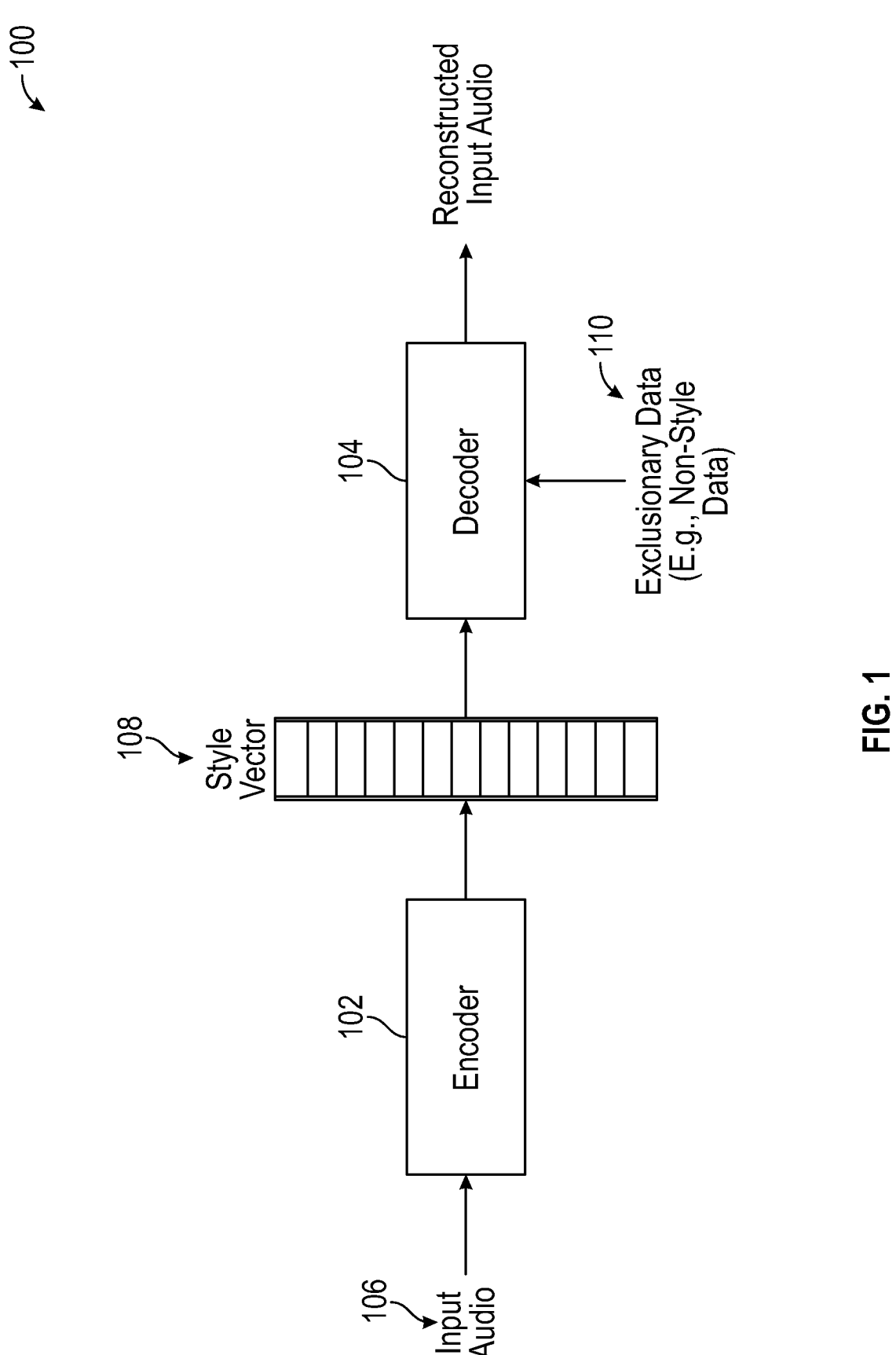
FIG. 1 illustrates a diagram of a style model according to an embodiment.

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements. Some of the embodiments or their aspects are illustrated in the drawings.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one," "a" or "an" are used in the disclosure, they mean "at least one" or "one or more," unless otherwise indicated.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Advances in the field of artificial intelligence (AI) have opened the door for development of a variety of new tools in multiple industries. One exciting application of AI is in the field of sound engineering, audio production and in particular, speech generation. Some tools can generate speech to mimic a speaker's identity, in the sense that listeners of the generated speech would typically identify the speech to be the speech of a familiar speaker. Speaker identity in this context refers to the attributes and characteristics imbued in the sound of a human that can cause others to associate the sound as the speech of that human.

Audio, in particular human speech, is not influenced only by a speaker's vocal identity. A variety of factors can affect speech. In other words, rarely a human speech exists in pure form and in a vacuum. Typically, an emotional energy or style permeates speech, and the speech is spoken in some environment that can affect the characteristics of the speech. For example, the emotional content of speech can include tranquility, anger, animosity, friendliness, determination, indecisiveness, or any range of human emotions that affect speech. The environment of speech can be a small room, a large auditorium, an outdoor venue, or any other environment, where humans may speak. The same speech spoken by the same speaker in different environments results in different sounds. Humans can be attuned to intuitively discerning both subtle and overt characteristics that influence speech. Even if humans cannot label the differences, they can discern a difference between speech spoken with different emotional content and/or in different environments. Consequently, AI speech generation systems and methods can benefit from being able to generate speech in the context of selected styles and selected environments. Furthermore, such systems and methods can be more useful in sound engineering, audio production and other applications if the style, environment, and other speech characteristics of the generated speech can be both understandable and controllable by a human operator.

The described embodiments include systems and methods that, not only can be used to produce speech with a selected speaker identity, but also with human-understandable, human-discernable, and human-controllable style and/or environment characteristics. Style characteristics, among other elements, can include emotional content of the speech, as well as the environment of the speech (e.g., the type of room, or physical space in which a speech is spoken). Another example of style characteristics of speech in the context of the described embodiments can also include prosody, mode, and manner of speech as well. In the context of the described embodiments, style characteristics can include any manner of delivering speech that may be employed by a speaker. For example, an actor, besides characteristics that define the actor's vocal identity, may also employ a particular manner or style of delivering speech, that nonetheless can be emulated by other actors and can be considered distinct from the identity of that speaker. Such style characteristics can include a particular rhythm of inserting pauses, tune and emphasis across sentences or paragraphs (e.g., ending every sentence with a rising note), energy of a speech or lack thereof, and other stylistic modes of generating speech humans might employ, not all of which can be labeled or categorized, but are nonetheless discernable by humans. The described embodiments can capture audio characteristics, including the examples outlined above, and in general any audio characteristics that might influence and vary the human speech. The captured audio characteristics can be used in a controlled style vector to generate artificial speech that to a human listener convincingly includes the captured audio characteristics.

An audio production environment can benefit from an automatic speech generation system (SGS). In particular, to achieve more realistic and robust audio production and speech generation, artificial speech can be generated with style information. The style information can include audio characteristics related to the emotional energy of the speech, the environment of the speech and/or other characteristics. Furthermore, a robust SGS can include human-understandable and human-controllable style audio characteristics in conjunction with tools and user interfaces that allow a human operator to generate speech with a selection of a speaker identity, as well as a selection of style audio characteristics and respective degree or intensity of the presence of the style audio characteristics in the generated speech. At the same time, a robust SGS can allow for generation of speech, with no input or partial input from a human operator regarding the style audio characteristics of the generated audio.

The described embodiments include several examples of robust speech generation systems (SGSs). In some embodiments, a style vector is generated, and a style model is trained to encode style information in the style vector. During usage or inference operations, one or more audio clips containing selected audio characteristics can be fed to the style model. The style model can encode the audio characteristics in selected regions of a style vector. Consequently, the style vector includes human-understandable and controllable style audio characteristics. Human-understandability can refer to an ability for a human to specify a labeled human-understandable style audio characteristics, encoded in a selected region of the style vector. Example style audio characteristics can include: "loudness," "anger," "kindness," and any other human-understandable emotions. Style audio characteristics can also include audio characteristics derived from the environment of audio, such as room tone. These can include audio characteristics such as "reverb," "echo," "room size," "background fan noise," "children's noises," or any other sound related to the environment of sound. Controllability can refer to user interface elements or various tools that can manipulate specific regions of the style vector corresponding to a selected audio characteristic to influence the presence or intensity of the selected audio characteristic in generated speech. The style vector can be combined with a speaker identity vector, and a text to speech (TTS) model can use the combined vector to generate speech, where the generated speech carries the sound and identity of a speaker with the style audio characteristics embedded in the style vector.

FIG. 1 illustrates a diagram of a style model 100 according to an embodiment. The style model 100 can include an encoder 102 and a decoder 104. In some embodiments, a variational autoencoder (VAE) can be used to implement the encoder 102 and the decoder 104. The encoder 102 receives input audio 106 and compresses the input audio 106 into a style vector 108. The decoder 104 uses the style vector 108 and decompresses the information in the style vector 108 to reconstruct the input audio. A comparison of the reconstructed input audio and the input audio 106 can yield a loss measurement, corresponding to how well the encoder encoded the information from the input audio into the style vector 108. A variety of methodologies can be used to obtain the loss measurement between the input audio and the reconstructed input audio. Examples include vector, matrix or tensor subtraction of the input and the reconstructed input, mean-square error (MSE) measurement methods and others. Regardless of the loss measurement methodology used, during the training of the style model 100, the parameters of the encoder 102 that contribute to the loss measurement are determined and manipulated to reduce the overall loss measurement and improve the ability of the encoder 102 to efficiently encode information in the style vector 108. The training of the style model 100 can include utilizing back-propagation and gradient descent techniques. Through these training operations, the model parameters of the encoder are updated to minimize the loss measurement between the input audio 106 and the reconstructed input audio. Consequently, a trained encoder 102 can efficiently compress a vast amount of input audio into the limited space of a style vector. As an example, the input audio may be a matrix of hundreds or thousands of dimensions, where the style vector can be a vector of 512 dimensions (512 by 1).

The process of training the style model 100, described above, is performed for a batch of input audio 106 as training data in each training step, as opposed to a single input audio 106 sample. This is to prevent or minimize the likelihood that the style model 100 only learns to encode a single sample. The number of input audio 106 samples in a batch can depend on the hardware capabilities of the computer system upon which the style model 100 is being trained. For example, the number, size and capabilities of central processing units (CPUs), graphical processing units (GPUs), tensor processing units (TPUs) and other hardware components can affect the batch size. For some hardware, a batch size of 32, 64 or 256 can be possible options. A batch of training data, for example the input audio 106, can be run through the style model 100, where the loss measurements of each sample in the batch contribute to a combination loss measurement (e.g., an average), and the model parameters are updated to reduce the combination loss measurement. In this process, a training step can refer to one full run of a batch of training samples (e.g., 32, 64, 128, 256, or 512) through the encoder 102, decoder 104, and the updating of the model parameters based on a combined loss measurement and the associated backpropagation and gradient descent operations.

The overall pool of the training data can include thousands or millions of input audio 106 samples. In each training step, a random batch from the overall pool is selected, executed through the model, and the model parameters are updated. In the next training step, another random batch is selected and the process repeats for the next random batch. The process further repeats for multiple epochs, where each epoch refers to execution of the entire pool of training samples through the model once. As a result, the model re-visits a training sample multiple times in multiple epochs. By the end of the training, the encoder 102 can efficiently encode or compress an input audio 106 into the style vector 108.

Furthermore, the training operations described above trains the encoder 102 to encode any and all information in the input audio 106 into the style vector 108 in an entangled format. For example, any speaker identity information, any style and/or environmental audio characteristics information is encoded into the style vector 108 in an entangled format. Furthermore, the information encoded into the style vector 108 in an entangled format is not necessarily human-understandable and in many cases cannot be labeled to correspond to any specific human emotion or environmental audio characteristic. The described embodiments include techniques and systems to disentangle the information in the style vector 108, such that the encoder 102 encodes selected style audio characteristics into selected corresponding regions of the style vector 108. For example, some regions of the style vector 108 can include "loudness" information, some regions can include "anger" information, and so forth. When the style vector 108 can include dedicated regions to specific style audio characteristics, those characteristics can be manipulated to influence any speech generated by a TTS model conditioned by the style vector 108.

In some embodiments, the degree of entanglement of the information in the style vector 108 can be reduced by feeding exclusionary data 110 to the decoder 104. Exclusionary data 110 can be any information that is selected to be excluded from what the encoder 102 encodes in the style vector 108. The encoder 102 has very limited space in the style vector 108, relative to the input audio 106. For example, the dimensions of the style vector 108 are several orders of magnitude smaller than the dimensions of the input data. If any information is already present in or provided to the decoder 104, the encoder 102 does not have a high incentive to include that information in the style vector 108 because the information is repetitive for reconstructing the input audio 106. Consequently, the encoder 102 uses its limited space to encode other information that is not present or otherwise provided to the decoder 104 and is contributory to the reconstruction of the input audio 106. As an example, exclusionary data 110 can include speaker identity information, content information, text information (e.g., transcript of the input audio 106), or any non-style data. Such exclusionary data 110 may be otherwise available through other sources. The encoder 102 can conserve the valuable space in the style vector 108 for encoding information that is not otherwise available through other sources. For example, speaker identity information can be available via a speaker identity fingerprint or as an output of a speaker identity model, which outputs a speaker identity fingerprint. Furthermore, in applications where the style model 100 and the style vector 108 are deployed for the purpose of isolating style audio characteristics, the exclusionary data 110 can include any non-style data; therefore, training the encoder 102 to encode only style or style-related information into the style vector 108.

Figure 2A:
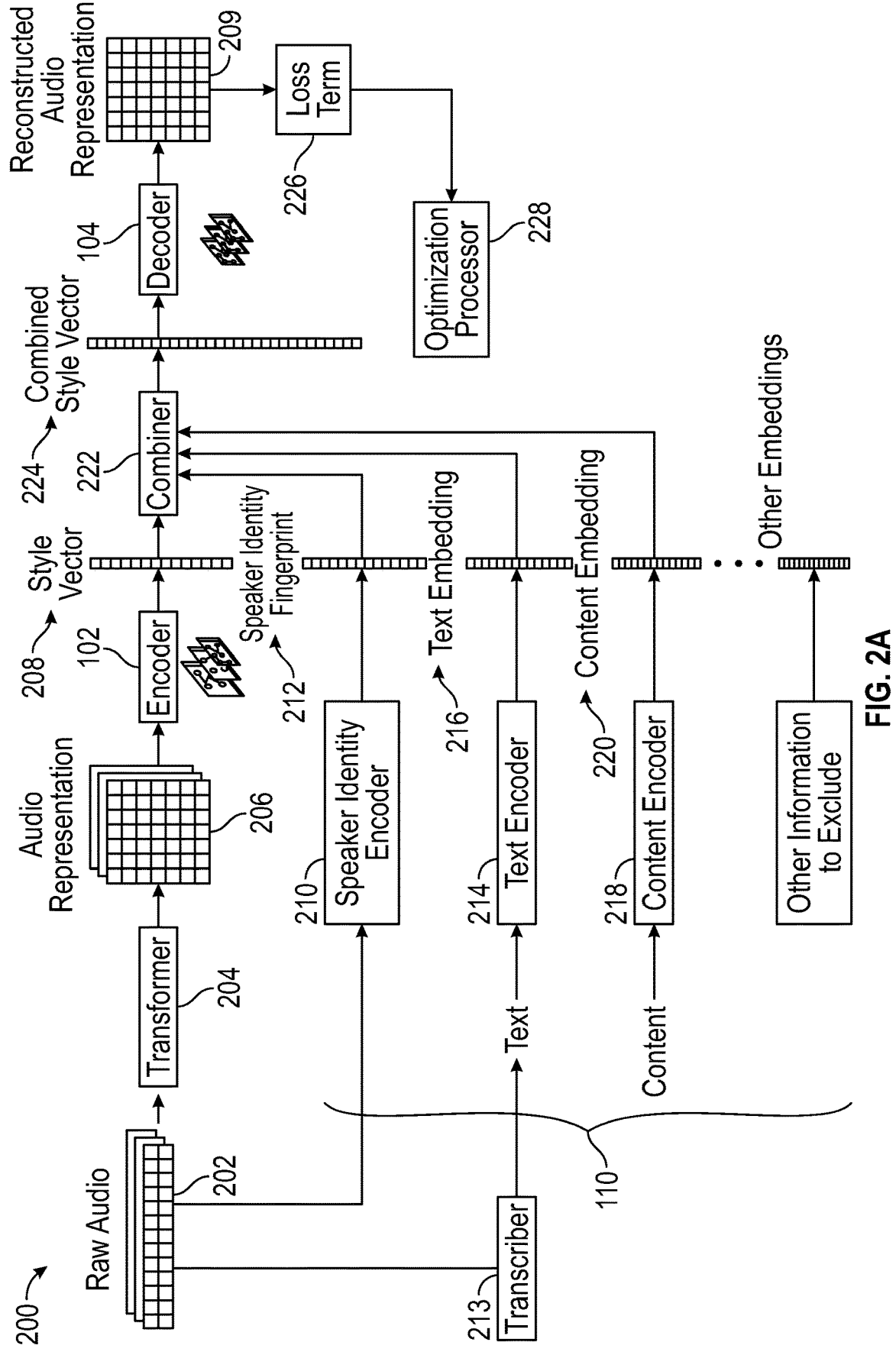
FIG. 2A illustrates a diagram of a style model, with examples of exclusionary data provided to a decoder.

FIG. 2A illustrates a diagram 200 of the style model 100, with examples of exclusionary data provided to the decoder 104 to train the encoder 102 to encode information other than the exclusionary data. The operations described in relation to the diagram 200 are applicable during the training of the encoder 102.

In some embodiments, the training and/or inference operations of an AI audio model, for example, a style model, speaker identity model, and/or a TTS model begins by converting raw audio to a format more manageable and/or compatible with such models. This is because audio can be difficult to model. For example, one second of stereo audio at 48 KHz sampling rate can be represented by a matrix of size 2×48,000. As the audio clips get longer, the matrix representation can become unwieldy to handle in artificial intelligence models. However, more compact and/or compressed representations can be used, whereby a transformer 204 can convert raw audio 202 into a more manageable representation, such as audio representation 206. In one example, spectrograms can be used, where a transformed audio representation 206, resembling that of an image can be generated and used in the described AI models. A spectrogram has more channels (e.g., more rows), but includes a more compressed representation of the audio, relative to raw audio 202. The output of a spectrogram transformer 204 can allow for application of image models, and the AI image processing techniques to the audio representation 206 as well. However, a spectrogram transformer is not the only compression mechanism that can be used. An audio codec is another example transformer 204, which can be used to compress the raw audio. Many other transformers 204 can also be used. These codec and transformers can be used to compress a very high dimensional raw audio signal into a signal and/or dataset that is more manageable and better compatible with the AI models that are to process the transformed audio. The transformers can generate representations of raw audio that can make modeling the timing component of generating speech, and training of the AI models, in general, easier, relative to using untransformed audio.

The raw audio 202 can be training data from a variety of sources, having a shared speaker, or having different speakers, containing speech with various emotions, and/or speech spoken in different environments. The raw audio 202 is converted to a transformed audio representation 206. The encoder 102 compresses the audio representation 206 into a style vector 208. For the operations of the diagram 200, where style information is isolated in a selected range of dimensions of a combined style vector 224, the training data, raw audio 202, need not be labeled. To train the encoder 102 to encode only style information in a region of a style vector, the decoder 104 can be provided with exclusionary data 110. In the example shown in the diagram 200, the exclusionary data 110 includes speaker identity fingerprint 212, text embeddings 216, content embedding 220, and any other embeddings we wish to isolate from what the encoder 102 learns to encode.

In the case of speaker identity, a speaker identity encoder 210 can be used to generate the speaker identity fingerprint 212 from the raw audio 202. While not shown, the speaker identity encoder 210 may include a transformer 204 as well, or can alternatively use the audio representation 206. In any case, the speaker identity encoder 210 extracts the speaker identity fingerprint 212 for the speech from the same speaker the encoder 102 encodes in the style vector 208. In this manner, when the speaker identity fingerprint 212 is provided to the decoder 104, the encoder 102 learns to not encode speaker identity information and instead use the limited space of the style vector 208 to encode audio characteristics, other than the speaker identity. Consequently, speaker identity is excluded from the range of audio characteristics the encoder 102 learns to encode. Speaker identity is one example of non-style audio characteristics. Similarly, other non-style audio characteristics can be provided to the decoder 104 to further train the encoder 102 to more narrowly focus on encoding style audio characteristics. For example, a transcriber 213 can be used to generate a transcript of the raw audio 202. A text encoder 214 uses the transcript to generate a text embedding 216, which can be provided to the decoder 104. A content encoder 218 can turn content other than text into a content embedding 220. A combiner 222 receives the exclusionary data 110, including for example, the speaker identity fingerprint 212, the text embedding 216, the content embedding 220 and any other embeddings to exclude, and generates a combined style vector 224. The combined style vector 224 can be a concatenation of the exclusionary data 110. The decoder 104 receives the combined style vector 224 and uses it to reconstruct the audio representation 206, generating the reconstructed audio representation 209. A loss term 226 is generated by a comparison of the reconstructed audio representation versus the input audio representation 206. Optimization processor 228 can deploy backpropagation, and gradient descent operations to determine which parameters of the encoder 102 are contributing to the loss term 226 and how to update them to reduce the loss term. As described earlier, each training step using the diagram 200 is performed for a batch of training data, or raw audio 202, where the loss terms from each training sample are combined into the loss term 226 and used by the optimization processor 228.

Figure 2B:
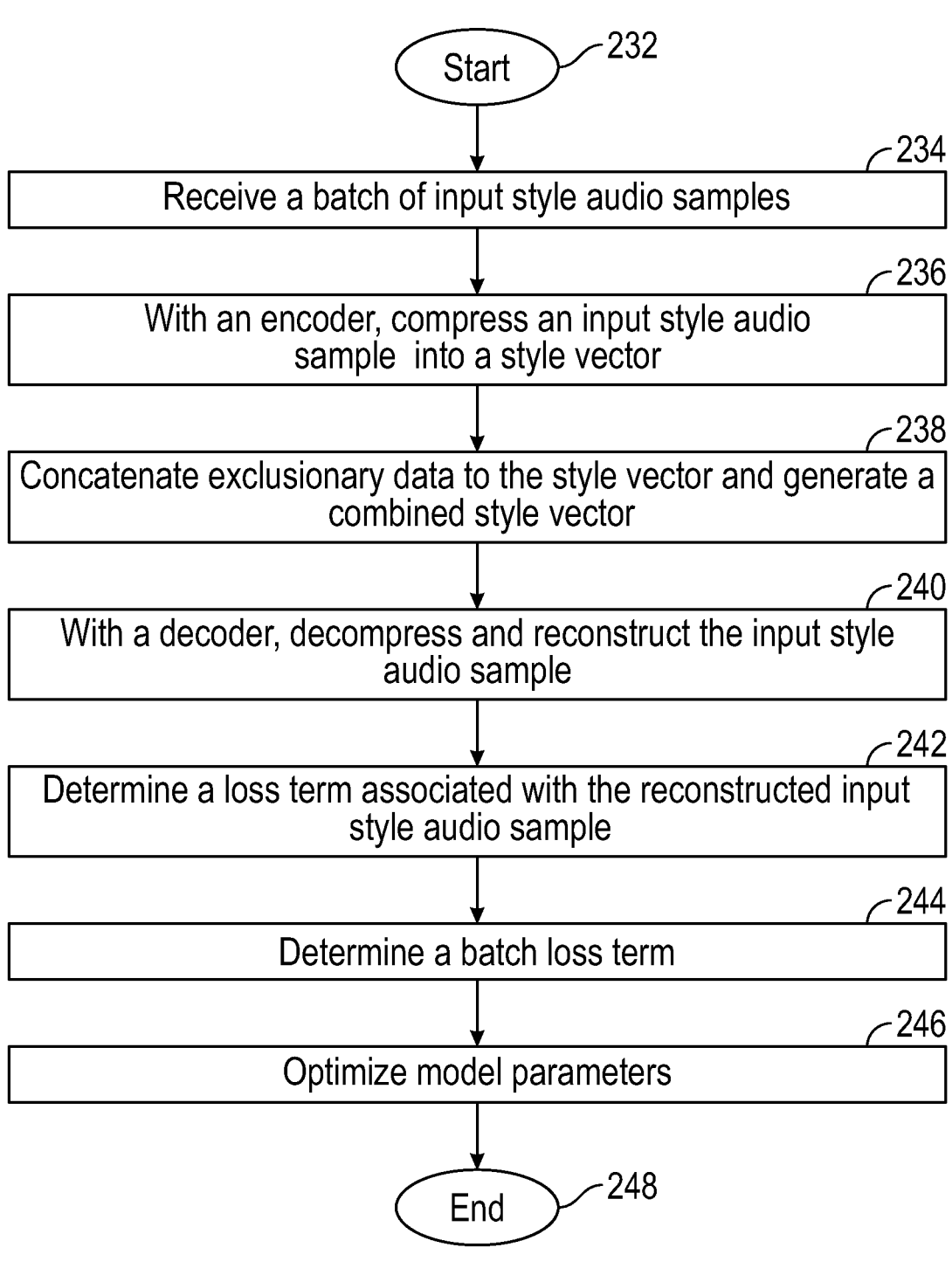
FIG. 2B illustrates a flowchart of a method of a training step for an encoder.

FIG. 2B illustrates a flowchart of a method 230 of a training step for the encoder 102. The method starts at step 232. At step 234, a batch of input style audio samples are received, for example, by random selection from a pool of training data. At step 236, the encoder 102 compresses an input style audio sample into a style vector. At step 238, exclusionary data, such as the exclusionary data 110 is concatenated to the style vector to generate a combined style vector. At step 240, a decoder (e.g., the decoder 104) decompresses the combined style vector and reconstructs the input style audio sample. At step 242, a loss term 226 associated with the reconstructed input style audio sample is generated. The loss term associated with the reconstructed input style audio sample can be generated based on a comparison of the input style audio sample and the reconstructed input style audio sample. A variety of techniques can yield the loss term at step 242, including statistical or non-statistical techniques, for example, distance averaging, mean square error (MSE) calculations, or other techniques. At step 244, a batch loss term is determined, for example by performing statistical or non-statistical operations on the loss terms obtained from each reconstructed input style audio sample in the batch. In some embodiments, the loss terms in the batch can be averaged to yield a batch loss term. As in step 242, other statistical or non-statistical techniques can also be used to generate the batch loss. At step 246, the parameters of the encoder 102 are optimized based on the batch loss term. The method ends at step 248. In some embodiments, for example for some training steps, the training method 230 can be performed, without adding the exclusionary data to the style vector and/or generating a combined style vector. For a next training step, the process 230 repeats with another batch of the style input audio samples from a pool of training data.

An encoder, trained according to the technique described in relation to the diagram 200, encodes entangled style information. Furthermore, the entangled style information may not be human interpretable or individually controllable. In other words, various style related information, for example, loudness, emotiveness, or room tone can be entangled across the various dimensions of the style vector 108, albeit the style vector 108 can be devoid of exclusionary data 110 as a result of performing the training technique described in relation to the embodiments of FIGS. 1 and 2. Additional embodiments of the described technology include training the encoder 102 to encode style information in a disentangled form, where the encoder 102 learns to encode style information related to an audio characteristic in a selected region of the style vector 108. Furthermore, each style region in the style vector 108 would correspond to a human-understandable style audio characteristic, such as a particular emotion in speech, a particular environment of the speech or other style characteristics, where a human-understandable label can be applied to such style characteristic. For example, assuming the style vector 108 can be a vector of 512 dimensions, the encoder 102 can learn to encode the emotion of "anger" in a selected range, such as dimensions 11-36. Other ranges in the style vector 108 can be selected to be used for encoding other audio style characteristics. To train the encoder 102 to encode disentangled audio style characteristics into a style vector, a first, second, and third disentanglement strategies can be used. A combination of the first, second and third disentanglement strategies can also be used.

First Style Disentanglement Strategy

Figure 3:
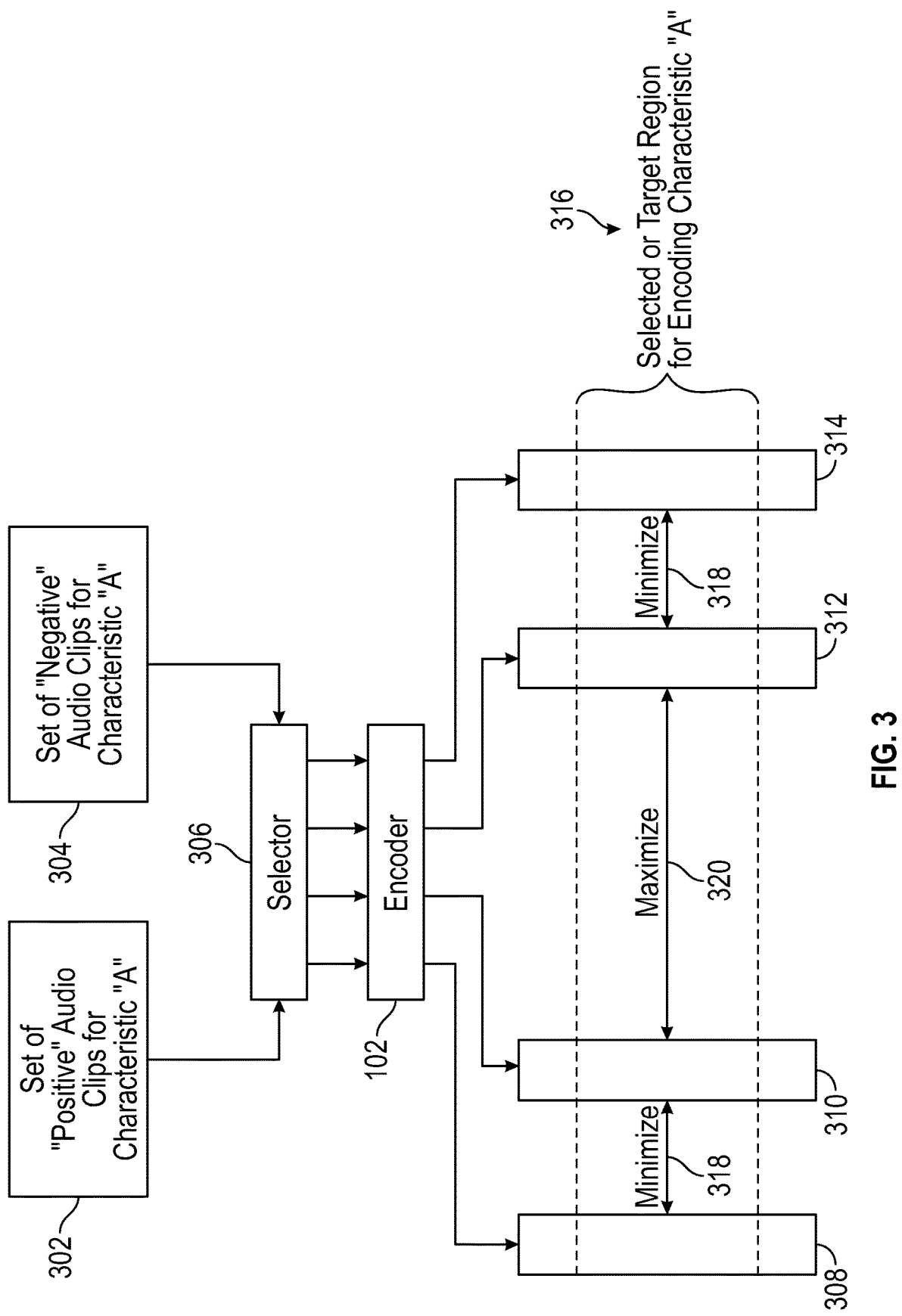
FIG. 3 illustrates a diagram of an example of a first style disentanglement strategy.

FIG. 3 illustrates a diagram 300 of an example of a first style disentanglement strategy (first strategy). The first strategy can use labeled training datasets, to train the encoder 102 to encode an audio characteristic "A" into a selected region of a style vector. The audio characteristic "A" can be a binary audio characteristic, or it can lie on a spectrum. For example, the audio characteristic "A" can be "emotiveness," which can be expressed in binary terms ("emotive" or "not emotive"), or expressed on a spectrum (starting from "very emotive" to "very flat"). A positive training dataset 302 and a negative training dataset 304 can be curated from a batch of training samples. The positive training dataset 302 can contain example style audio clips having a strong presence and/or intensity of the audio characteristic "A." The negative training dataset 304 can have sample audio clips, having a lack of characteristic "A," a weak presence of the characteristic "A," or a style contrary or opposite to the quality and style of the characteristic "A." In other words, the positive training dataset 302 can contain audio samples having affirmatively the characteristic "A," and the negative training dataset 304 can contain audio samples having affirmatively negative of the characteristic "A." Some binary examples can include pairs, such as "anger" and "calmness," "emotiveness" and "flat," "happy" and "sad," "loud" and "quiet," in each respective training sets 302, 034.

Non-binary characteristics can also be used in constructing the training sets 302, 304. In this scenario, range assignment and/or thresholding techniques can be used to construct the positive and negative training datasets 302, 304. As an example, when the audio characteristic "A" is "emotiveness," emotiveness can be quantified by a value in the range of 1-10, with "10" indicating "very strongly emotive," and "1" indicating "nearly flat." In this scenario, audio clips having emotiveness in the range above "7" can be placed in the positive training dataset 302. Audio clips having emotiveness in the range below "3" can be placed in the negative training dataset 304. The remaining audio clips having emotiveness in the range "4-6" can be discarded, and not used for the purposes of training according to the first strategy. Although, they can be used in other training steps. Training step can refer to running a batch of training samples through an AI model from beginning to end and updating the AI model parameters, based on a loss function obtained by running the batch of samples through the model. The positive and negative training datasets 302, 304 can be constructed for each batch at the beginning of a training step.

During each training step, a selector 306 can randomly select two audio clips from each training dataset 302, 304 and obtain respective style vectors 308, 310, 312, and 314 for each randomly selected audio clip. In some embodiments, the encoder 102 can be used to generate the style vectors 308-314, but in other embodiments, any embedding engine that can reduce or compress dimensionality can be used. Next, within a region 316, selected to encode audio characteristic "A," the distance between the style vectors from the same datasets are minimized, and the distance between the style vectors from different datasets are maximized. Minimizing the distance between the style vectors in the same training dataset within a selected region, and maximizing the distance between the style vectors from different datasets, within the selected region incentivizes the encoder 102 to encode the characteristic "A" into the selected region.

Various methods can be used to perform the described minimizing and maximizing in a selected region. In one embodiment, to minimize the distance between the style vectors in the same training dataset, a measure of distance 318 between the style vectors 308, 310 and 312, 314, in the selected region 316, can be added to the loss term during a training step. Since the training process aims to reduce the loss term, the distance 318 is minimized. Conversely, to maximize the distance between the style vectors in the negative training dataset, a measure of distance 320 can be subtracted from the loss term, during a training step. Since the training process aims to reduce the loss term, the distance 320 is maximized. The minimizing and maximizing process encourages the encoder 102 to encode as much information as possible about the audio characteristic "A" into the selected region 316. In other words, both the positive and negative training datasets 302, 304 contain information about the characteristic "A," which the maximizing and minimizing processes described above, encode into the selected region 316. Consequently, the first training strategy encodes both positive and negative aspects of a target characteristic, such as characteristic "A," into a target region, such as the region 106. Audio characteristics unrelated to the target characteristic are likely encoded elsewhere in the style vectors.

The distances 318 and 320 can be calculated by a variety of methods. As an example, if the region 316 includes "5" dimensions, those dimensions in the region 316 can be subtracted from one another and the results averaged to yield a measure of distance. As an example, a first and second style vectors V and W, both derived from the positive training dataset 302, can both have dimensions 1-512, where the dimensions 1-5 in each style vectors V and W are selected for the encoder 102 to encode the target characteristic "A." The first style vector V can include values v1 through v512 ($V<v1, v2, \ldots, v512>$), and the second style vector W can include values w1 through w512 ($W<w1, w2, \ldots, w512>$). To generate the distance 318, first, the values from the same dimensions, in region 316, can be subtracted: $<V-W>|$ in target region $316=<v1-w1, v2-w2, \ldots, v5-w5>$. Next, the resulting values can be averaged to yield a measure of distance: distance=Average ($v1-w1, v2-w2, \ldots, v5-w5$). The described technique is but one possible method. Persons of ordinary skill in the art can utilize other measures of calculating distance in lieu of, or in addition to the method described above.

FIG. 4 illustrates a flowchart of a method 400, where the first style disentanglement strategy can be used to train the encoder 102 to encode an audio style characteristic into a selected region of a style vector. The method starts at step 402. At step 404, a random batch of training data samples are received. At step 406, a positive and negative training dataset 302, 304 can be curated as described above. The method 400 can be performed whether or not both datasets 302, 304 can be constructed. The steps described above in relation to the embodiment of FIG. 3 and the steps described in relation to the method 400 can be performed or not performed, based on availability of the training data samples in each training dataset 302, 304. For example, some steps can be performed in subsequent training steps, as different batches of training data samples are received in step 404. In each training step, and every time the method 400 is executed, the training data samples change. Not every batch includes samples in each training dataset 302, 304. Depending on the availability of the positive and negative training data samples, the maximizing and minimizing operations can be performed, or not performed in each training step.

At step 408, two samples from the positive training dataset 302, and two samples from the negative training dataset 304 are selected randomly. At step 410, each dataset is encoded into a style vector, for example, the style vectors 308, 310, 312 and 314. At step 412, within a region of the style vectors, selected to encode a target audio characteristic, for example, a target region 316, a first and second distance parameters are calculated. The first distance parameter is the distance 318, or the distance between two style vectors derived from the same training dataset (positive or negative), where the distance is taken between the two vectors in the selected region. The second distance parameter is the distance 320, or the distance between two vectors derived from the opposite training datasets 302, 304, where the distance is taken between the two vectors in the selected region (e.g., the target region 316). At step 414, a corresponding loss term from the first strategy, based on the first and second distances can be added to the loss term of the training step. For example, the first distance related to the style vectors generated from the same training dataset can be added to the loss term of the training step, and the second distance related to the style vectors from the opposite training dataset can be subtracted from the loss term of the training step. The method ends at step 416.

The method 400 can be modified based on availability of the samples in the positive or negative training datasets in the batch initially received or randomly chosen at step 404. For example, if a batch does not include any positive or negative samples, during a training step, the method 400 is not performed, and only the method 230 may be performed. If only one sample from each training dataset 302 may be available only the second distance parameter, distance 320 is subtracted from the loss term of the training step (e.g., the loss term in step 242 of the method 230). If only two samples from the same training dataset are present in a batch, only the first distance parameter, the distance 318 can be added to the training step loss term (e.g., the loss term in step 242 of the method 230). In other words, not all four style vectors and their corresponding training dataset need to be present at once for the method 400, nor do all the steps of the method 400 need to be performed in every training step. As an example, if a randomly chosen batch "B1" of "16" training data samples contain "8" samples having the characteristic "A," and none that contain the opposite of the characteristic "A," the minimization step can be performed in the training step processing the batch "B1," and a maximization step can be skipped. If the next batch "B2" randomly chosen for a subsequent training step contains only one sample having characteristic "A," and one sample having the opposite of characteristic "A," a maximization step can be performed in the training step processing the batch "B2," and the minimization step can be skipped. If a next batch "B3" randomly chosen for a subsequent training step contains "8" samples having characteristic "A," and only "1" sample having the opposite of characteristic "A," for random pairs chosen for samples in the same training dataset 302, the minimization step can be performed, and for each sample in the training dataset 302 and the one negative sample in the training dataset 304, the maximization step can be performed.

Furthermore, the method 400 can be performed interleaved with the training method 230, or it can be performed sequentially, relative to the training method 230. For example, a batch of training data samples can be processed using the method 230 one sample at a time, loss term calculated, then the method 400 can be performed and the yielded loss terms can be added to the calculated loss term and then the encoder 102 can be optimized to reduce the loss term. Alternatively, the method 230 can be performed for all samples in a batch, then the method 400 can be performed for all samples in a batch. The loss terms for method 230 and the method 400 can be added, and then the encoder 102 can be updated to reduce the combined loss terms.

Second Style Disentanglement Strategy

When training samples are similar or identical, but differ in a target characteristic (e.g., characteristic "B"), a second disentanglement strategy (second strategy) can be used to train the encoder 102 to encode the target characteristic into a selected region of a style vector. Examples of similar or identical training samples with variation in one characteristic can include scenarios where a speaker produces the same speech with the same style, but in different rooms. In this scenario, the recorded training samples are similar or identical, but differ in "room tone." Another example where the second strategy can be useful is in the case of "time shifting," referring to a scenario where the same audio is present in different training samples, but with different timing. For example, one clip can include a longer initial silence before the audio, another clip can include more pauses between the audio and so forth. Such training samples have similar or identical audio, with differing "timing" characteristics. The varied characteristics can be encoded in a target region of a style vector.

Figure 5:
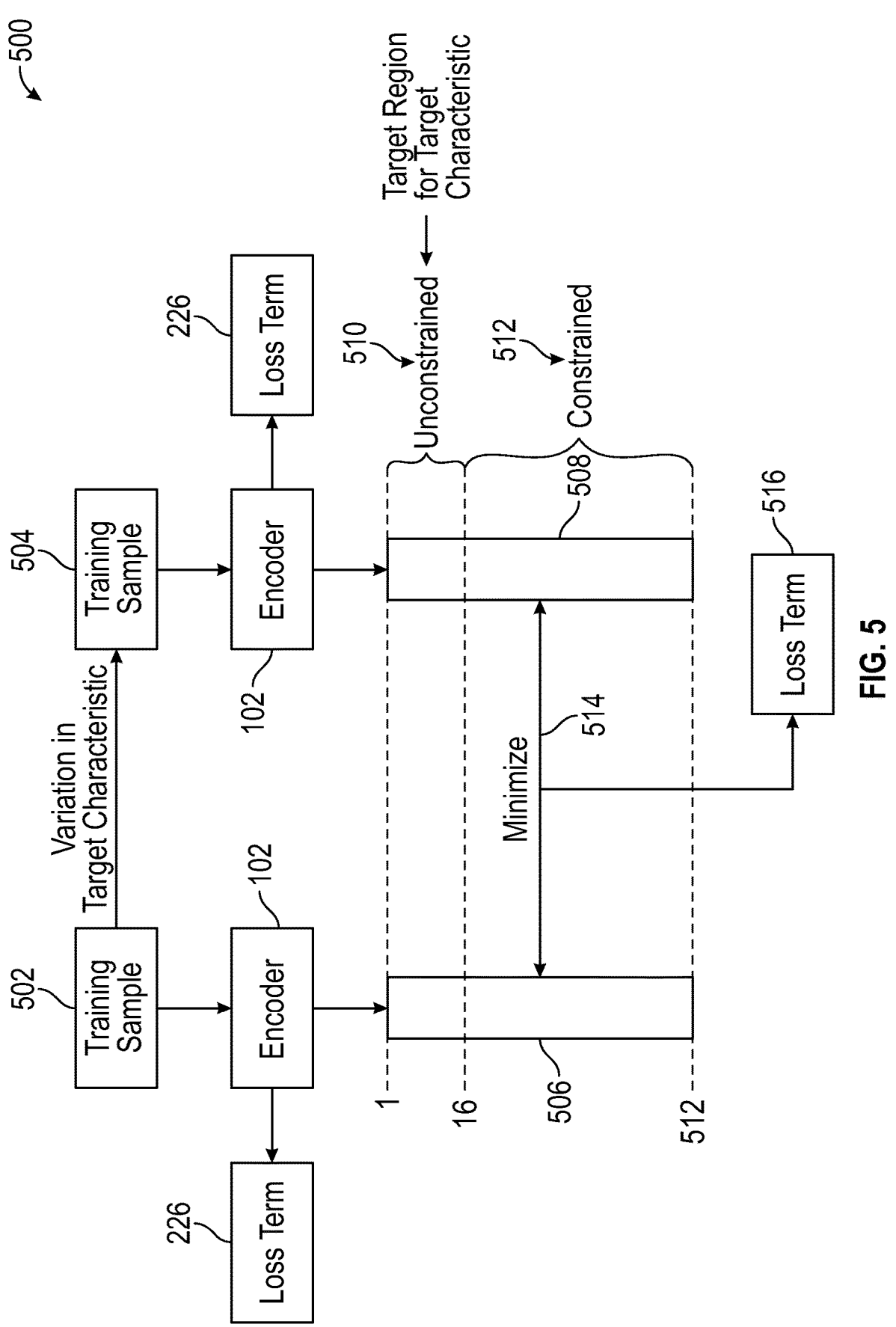
FIG. 5 illustrates a diagram of an example of a second style disentanglement strategy.

FIG. 5 illustrates a diagram 500 of an example of a second style disentanglement strategy (second strategy). Training samples 502, 504 are similar or identical in all respects, but differ in a target characteristic. The training samples 502, 504 can be used to perform the second strategy. The encoder 102 generates the style vectors 506, 508 from the training samples 502, 504, respectively, for example by performing the method 230. Loss terms 226 are generated for each style vector 506, 508. To train the encoder 102 to encode the target characteristic into a target region, the style vectors 506, 508 are divided into the unconstrained region 510 and the constrained region 512. The unconstrained region 510 is used as the target region where the encoder 102 learns to encode the target characteristic. A distance 514 in the constrained region 512 is used to generate a loss term 516. As an example, the dimensions 1-16 of the style vectors 506, 508 can be allocated for the unconstrained region 510, the remaining dimensions 17-512 can be the constrained region 512. The distance 514 can be generated by taking the difference between the values of the same dimensions of each style vector 506, 508 and averaging the results, similar to the distance measurement techniques described in relation to the embodiment of FIG. 3. Other methods of calculating the distance between the constrained regions 512 of the style vectors 506, 508 can also be applicable or used. The distance 514 can yield a loss term 516. The loss term 516 can be minimized by adding it to the encoder 102 loss terms 226. The terms constrained and unconstrained refer to the pressure the second strategy puts on the encoder to minimize the difference between the style vectors in the constrained region, forcing the encoder to put any information that differs between the training samples into the unconstrained region, thereby encoding the target characteristic into the unconstrained region. Nonetheless, the encoder is still under pressure to encode useful information in both constrained and unconstrained regions, due to the pressure from training according to the method 230. In some embodiments, an additional loss term can be generated and added that maximizes the distance or difference between the values in the unconstrained region 510. However, this additional loss term is not always used, since it is possible that the target characteristic can still produce the same or similar audio. For example, two different rooms may still have the same tone.

Figure 6:
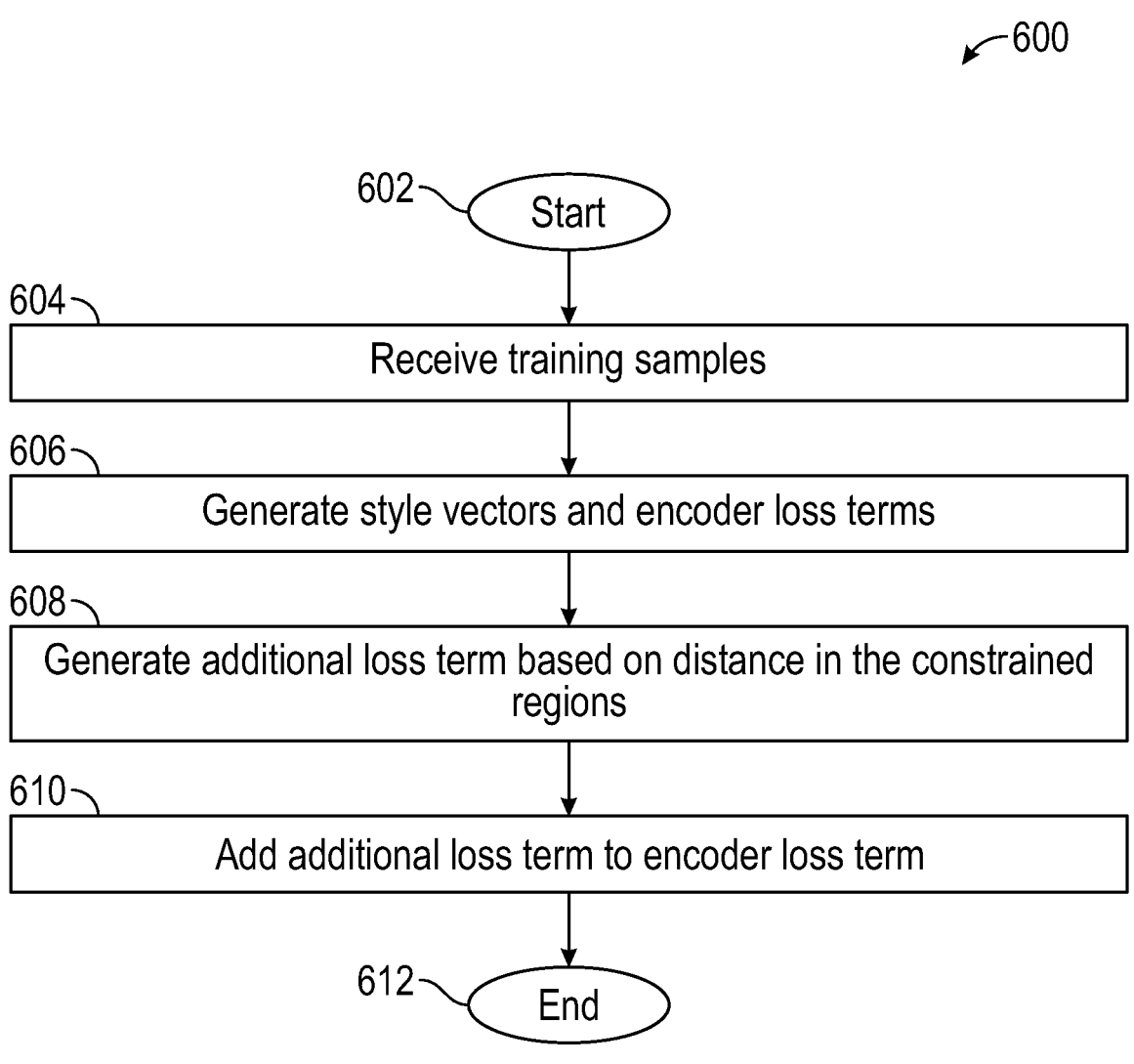
FIG. 6 illustrates a flowchart of a method, where the second style disentanglement strategy is implemented.

FIG. 6 illustrates a flowchart of a method 600, where the second strategy can be used to train the encoder 102 to encode an audio style characteristic into a target region of a style vector. The method starts at step 602. At step 604, similar or identical training samples that are different in a target characteristic are received. The training samples 502, 504 may be present in a batch of training samples, or they may be generated from a seed audio sample. Other techniques can also be used to curate the training samples 502, 504. At step 606, the encoder 102 can encode the training samples 502, 504 into style vectors 506, 508, respectively, generating loss terms 226 in the process. The style vectors can be divided into constrained and unconstrained regions 510, 512, respectively. The unconstrained region can be used to encode the target characteristic, which is the audio characteristic that differs between the training samples 502, 504. Steps 608, 610 minimize the difference or the distance in the constrained region, incentivizing the encoder 102 to encode information that is different between the training samples 502, 504 into the unconstrained region. At step 608, an additional loss term is generated based on the difference in values in the constrained region 512. At step 610, the additional loss term is added to the encoder loss terms, generated at step 606. The method ends at step 612. The method 600 can be repeated for the training samples in a batch of training samples. When more than two samples are used an average difference method of calculating the distance in the constrained regions 512, or other statistical methods can be used to generate the additional loss terms in step 608. In other words, the method 600 can be performed for more than two training samples.

Third Style Disentanglement Strategy

A third disentanglement strategy (third strategy) can be used when labeled input training samples may be available. The labels can include categorical labels, for example those representing discrete audio characteristics, or numerical labels, representing audio characteristics on spectrums. A classification network, for example one or more classifiers, can be used in conjunction with the encoder 102, and decoder 104 network during training. The input to a classifier can be the values in a target region of the style vector, in which a labeled audio characteristic is to be encoded.

Figure 7:
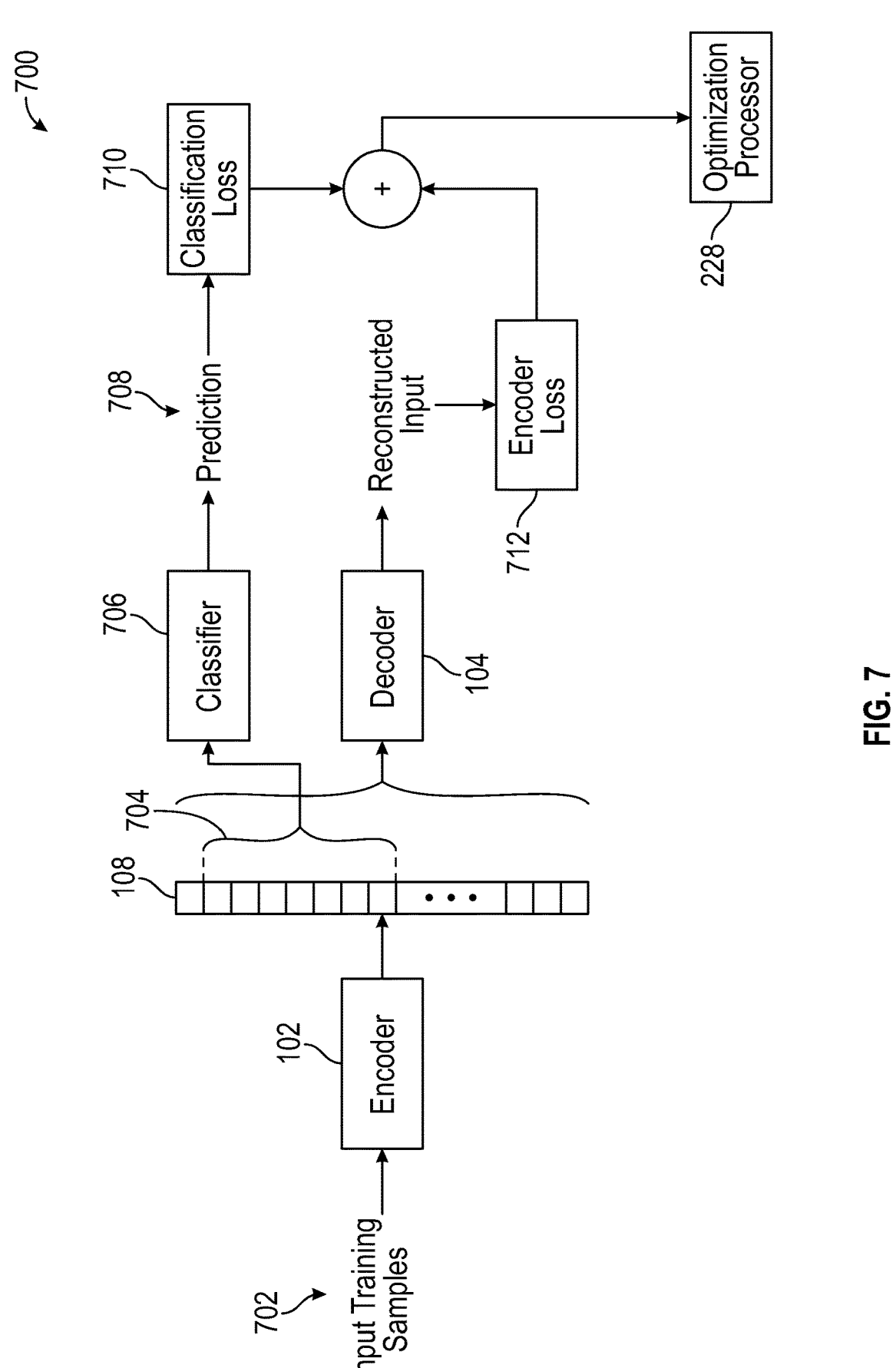
FIG. 7 illustrates a diagram of a third style disentanglement strategy.

FIG. 7 illustrates a diagram 700 of the third style disentanglement strategy. Input training samples 702 can include labeled audio samples with categorical or numerical labels. The encoder 102 encodes the input training sample 702 into a style vector 108, for example, according to the method 230. The decoder 104 can reconstruct the input training samples 702 from the style vector 108, generating an encoder loss 712. The encoder loss 712 can be the same as the loss term 226, described above. A target region 704 can be selected to correspond to a labeled audio characteristic present in the input training samples 702. The classifier 706 can receive the values in the target region 704, as input, and generate a prediction 708, and the classification loss 710. The classification loss 710 can be added to the encoder loss 712, and the combined loss can be used by the optimization processor 228 to update the encoder 102 parameters to reduce the combined loss. The set up described in the diagram 700 incentivizes the encoder 102 to encode any information in the input training samples, relevant to solving the classification task, into the target region 704. While one target region 704 is shown, several target regions 704 corresponding to various labeled audio characteristics and their associated classifiers 706 can also be used to encode various other audio characteristics into the style vector 108.

Figure 8:
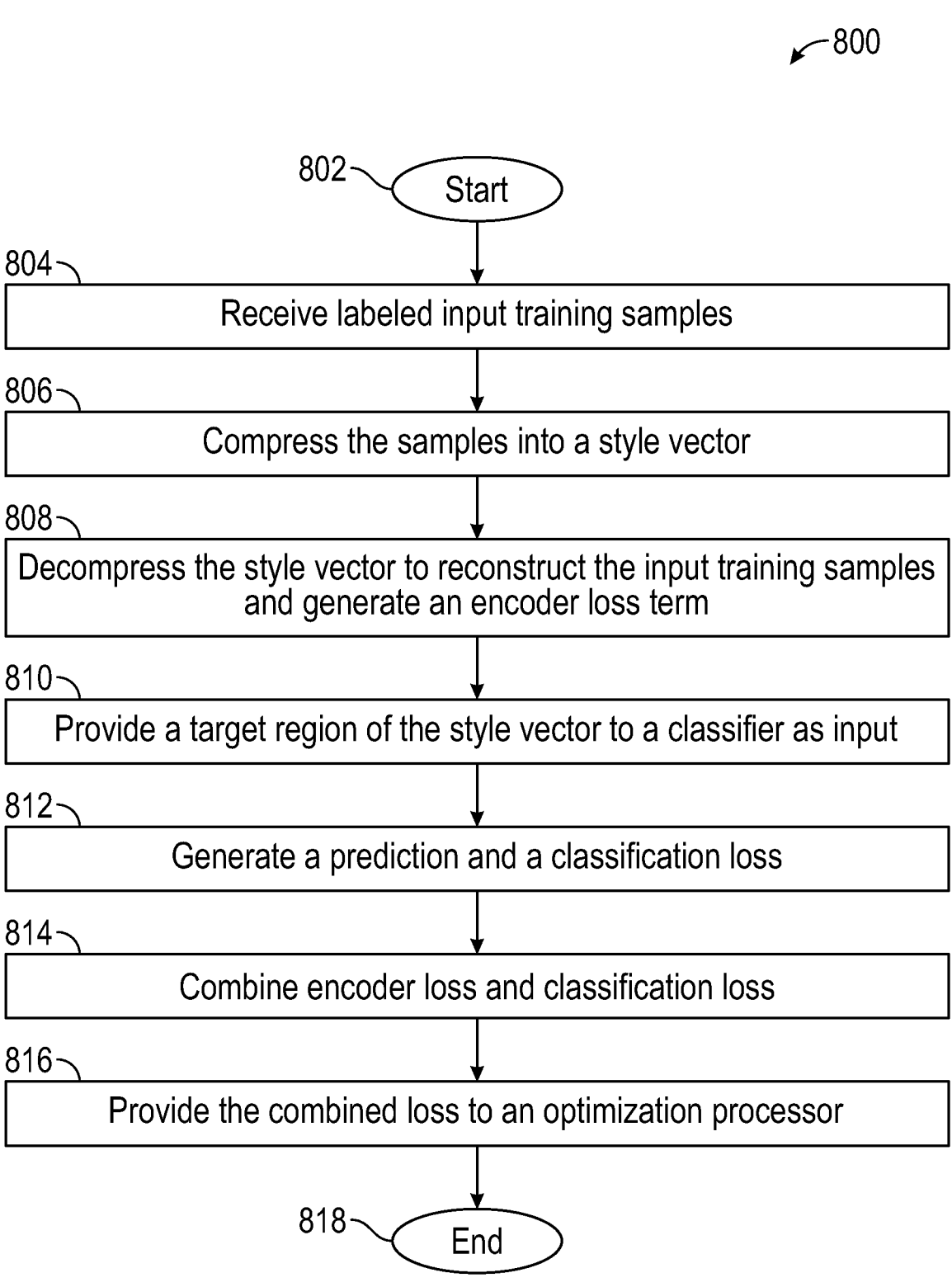
FIG. 8 illustrates a flowchart of a method, where the third style disentanglement strategy is implemented.

FIG. 8 illustrates a flowchart of a method 800, where the third strategy can be used to train the encoder 102 to encode an audio style characteristic into a target region of a style vector. The method starts at step 802. At step 804, labeled input training samples 702 are received. At step 806, the encoder 102 compresses the input training samples 702 into the style vector 108. At step 808, the decoder 104 decompresses the style vector 108 to reconstruct the input training samples and, in the process, generates an encoder loss 712. At step 810, a target region 704 of the style vector 108 is provided as input to a classifier 706. At step 812, the classifier 706 generates a prediction of the label applicable to the target region 704. The predicted label can be compared against the known label of the training sample as received in step 804, and the comparison can yield a classification loss 710. At step 814, the encoder loss 712 and the classification loss 710 can be combined, for example by adding them together. At step 816, the combined loss can be provided to the optimization processor 228, which can update the parameters of the encoder 102, in order to reduce the combined loss in subsequent runs of the encoder 102 operations. The method ends at step 818. The method 800 can be performed for a batch of labeled input training samples and more classifiers 706 corresponding to various audio characteristics can be used to encode the various audio characteristics in multiple target regions 704 in the style vector 108.

While the method 800 can be performed when labels for every training sample are present, it can also be performed when only labels for a subset of the training data are available. For example, in the limited label scenario, a semi-supervised classification approach can be used, in which a default zero classification loss is assigned for any training samples that do not have labels, thus not influencing the gradients of the backpropagation algorithm for the unlabeled training samples.

If multiple label classes are available (e.g., labels for "emotiveness" and labels for "rising pitch" versus "falling pitch"), an arbitrary number of classifiers can be added to encode different and even potentially overlapping audio characteristics, when the characteristics are correlated (e.g., anger level and loudness of speech), into various regions of the style vector 108. Combining first, second and third style disentanglement strategies The first, second and third strategies can be freely combined, and multiple audio characteristics can be treated with each strategy, to generate a final style vector that has distinct, and, if selected, potentially overlapping regions encoding for specific audio characteristics, as well as, if selected, a completely "free" region that encodes for everything else that might make up the style of an audio clip, as identified by the encoder 102, but might otherwise escape clear human classification.

Figure 9:
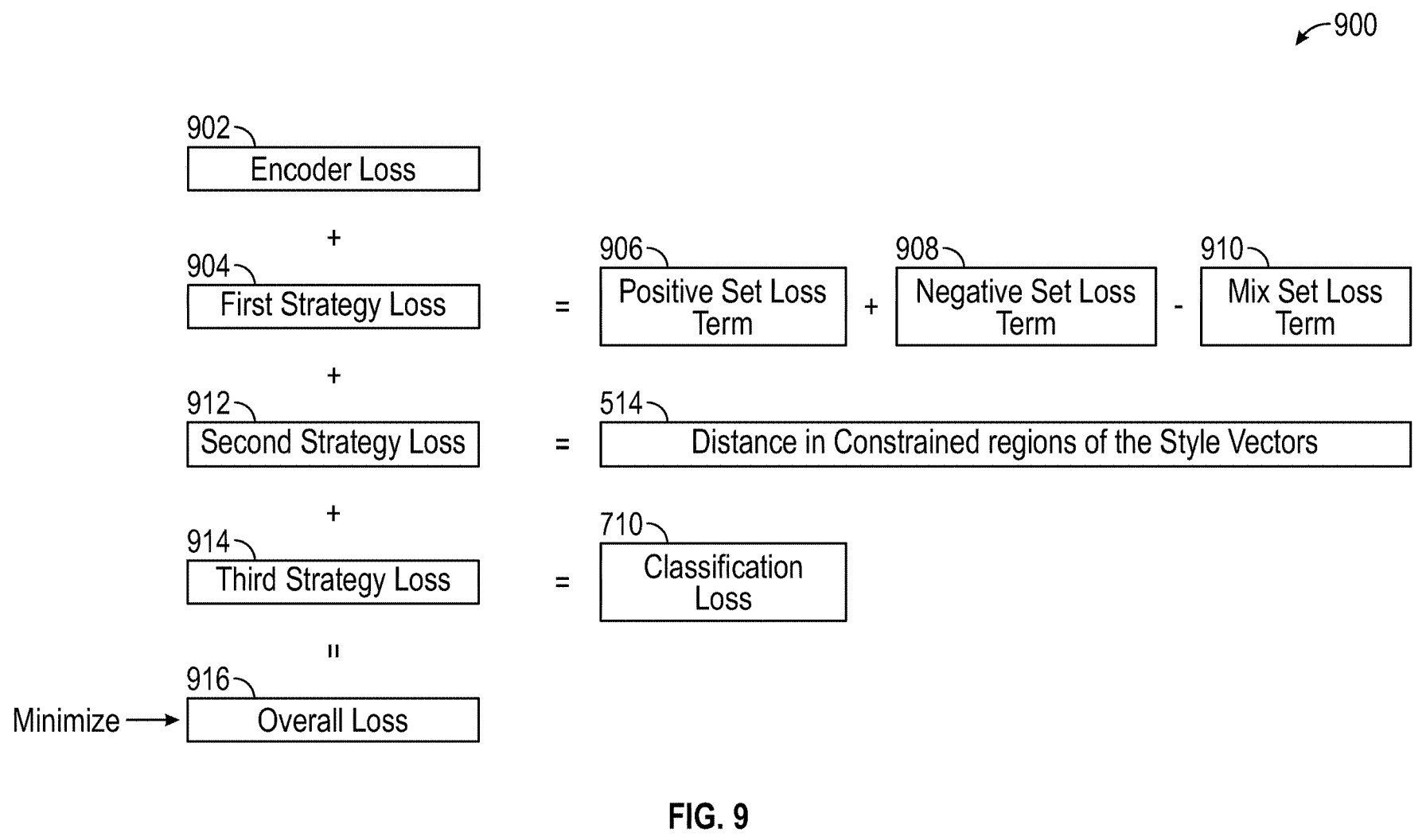

FIG. 9 illustrates a diagram 900 of the training objective of the encoder 102 and the treatment of various loss terms in relation to the three strategies discussed above. performing method 230 can yield an encoder loss 902. In the embodiments, where a variational autoencoder (VAE) is used, the encoder loss 902 can, in turn, include other loss terms, such as a reconstruction loss term, a regularization loss term, and others. If other models are used to reconstruct the input audio samples, other loss terms may also be applicable, depending on the model used.

Performing the first strategy, for example, based on method 400 can yield at least three categories of loss terms, which can be combined into the first strategy loss 904. The three categories of loss terms from performing the first strategy include a positive set loss term 906, a negative set loss term 908, and a mix-set loss term 910. Referring to FIG. 3, the positive set loss term 906 can be obtained from the distance 318, in the target region 316, between the style vectors derived from the positive training dataset 302. The negative set loss term 908 can be obtained from the distance 318, in the target region 316, between the style vectors derived from the negative training dataset 304. The mix-set loss term 910 can be obtained from the distance 320, in the target region 316, between the style vectors obtained from the positive and negative training datasets 302, 304, respectively. The positive set loss term 906 and the negative set loss term 908 are to be minimized, and are therefore added to the first strategy loss 904. The mix-set loss term 910 is to be maximized, and is therefore subtracted from the first strategy loss 904.

Performing the second strategy, for example, based on method 600 can yield a second strategy loss 912. Referring to FIG. 5, the second strategy loss 912 can be obtained from the distance 514, in the constrained region 512 between the style vectors 506, 508.

Performing the third strategy, for example, based on method 800, can yield a third strategy loss 914. Referring to FIG. 7, the third strategy loss 914 can be obtained from the classification loss 710.

The encoder loss 902, the first strategy loss 904, the second strategy loss 912, and the third strategy loss 914 can be added to obtain an overall loss 916. An objective of the training of the encoder 102 is to reduce the overall loss 916, for example when performing the training based on method 230. Furthermore, the described loss terms may be in multiples when any strategy is used for multiple audio characteristics, each characteristic and the employed strategy contributing a loss term to the overall loss 916. Furthermore, in some embodiments, each loss term can be scaled up or down by a multiplication factor, depending on the optimization objectives of a particular implementation of the described embodiments. The more a loss term is scaled up, the more the described encoder prioritizes reducing that loss term.

Inference Operations

The encoder 102, which can be termed a style encoder, once trained, can be used in conjunction with one or more additional AI models to generate artificial audio. Furthermore, the encoder 102, trained according to the embodiments described above, can generate a style vector with selected regions corresponding to selected audio characteristics. In one embodiment, the encoder 102 can be used in conjunction with a speaker identity encoder 210 and a text to speech (TTS) model. In this scenario, a speech generation system (SGS) includes the encoder 102, the speaker identity encoder 210, and the TTS model. Training of the full SGS model can proceed in a sequential way. First, the speaker identity encoder 210 is trained. Next, the style encoder 102 is trained using the speaker identity encoder 210, as an auxiliary model to provide speaker identity fingerprints to the decoder 104. Finally, the TTS model can use both the speaker identity encoder 210 and the style encoder 102, as auxiliary models. The TTS model can use the concatenated outputs of both, the speaker identity encoder 210 and the style encoder 102, as the conditioning vector. The joint conditioning can also be used during TTS inference operations. In some embodiments, the speaker identity encoder 210 can be optional. In other words, the SGS can obtain a speaker identity fingerprint vector from an external source, as opposed to including and training the models for generating the speaker identity fingerprint.

Data

The data used to train the style encoder can depend on the selected disentanglement and controllability characteristics in a particular implementation or usage of a SGS. If in an implementation, it is selected to separate speaker identity and style, and the implementation is selected to have an overall style conditioning based on a reference clip, the style encoder 102 can be trained, without any labeled or specific data. For example, speech data representing the selected variation of styles can be used, and the encoder 102 can capture those styles and their variations in a mixed and entangled manner. In some implementations, the same speech data that is used for training the TTS model can also be used when training the encoder 102.

If in an implementation further disentanglement of audio characteristics are desired, additional labeled data can be obtained and/or generated to use with the first, second and third strategies, as described above. For example, for the first strategy, a set of "positive" and "negative" examples of a particular characteristic can be obtained or generated. Examples include: "very emotive" versus "completely flat," "happy" versus "sad," "whispered" versus "shouted," and so forth. However, not all training data need to be labeled in this manner, only a subset used in performing the first strategy.

Similarly for performing the second strategy, pairs (or tuples) of data can be obtained or generated. The pairs or tuples represent identical or similar speech in all characteristics except a target characteristic. The target characteristic is the audio characteristic, which can be disentangled using the second strategy. The training data for performing the second strategy can be a smaller subset of the full training data, where the additional losses derived from performing the second strategy can be applied exclusively to this smaller subset, or alternatively applied in an interleaved manner between the training steps.

In some embodiments, data acquisition or generation for both first and second strategies can include automated data augmentation, either in advance, or during the training. For example, a target audio characteristic can be varied on an existing audio clip in an automated fashion. The variation can be either applied in advance, or during training time, to generate multiple examples of a single clip. Furthermore, the variation can be applied in a manner to generate a training dataset for the first or the second strategies. For example, a base clip with clean audio, can be processed in different acoustic models to simulate various audio characteristics (e.g., different room tones, etc.) The simulated audio characteristics can be used to augment the base clips to generate training data samples for the first or second strategies.

In some embodiments, audio clips that contain "pure" attributes can be used. An example of this scenario includes silent audio clips (e.g., "no speech" audio clips) that nonetheless have recorded or otherwise include room tone characteristics information. Such audio clips contain pure representations of room characteristics or room tone. Various vector operations can be performed with "pure" audio clips. For example, the trained encoder 102 can generate a first style vector from a "pure" audio clip that includes room tone. A pure silence reference vector can be subtracted from the first style vector to yield the room tone style vector for that particular room. The room tone style vector can be applied to other style vectors to generate speech that sounds as if the speech was spoken in that room.

Some Advantages of the Style Vector Generated by a Trained Style Encoder 102

The style encoder is not limited to a fixed set of characteristics, or even to existing audio characteristics such as reverb, room size, equalization (EQ) or others. Instead, in part, it encodes and encapsulates the set of labeled data that it receives during training, as well as any other audio characteristics that the encoder model determines to be relevant for speech generation. For example, the encoder model may receive sounds labeled from two rooms, A and B. The style encoder learns what characteristics belong to each room, such that it can generate audio that matches the sound of each room. The training data need not necessarily provide any categorization of what makes the rooms sound different; rather, the style encoder model learns those characteristics. For example, speech in room A may sound different than speech in room B because the rooms may be different in size, but the style encoder only receives a label of what training data sample corresponds to each room. Through training the model learns the audio characteristics that differentiate the two rooms.

This example demonstrates an advantage over existing, "manual" approaches to modeling room sound. For example, traditionally, an audio engineer may have to use a multitude of audio adjustments such as reverb, EQ, and others to approximate what makes the speech sound different in one room versus another. This approach can be imperfect, and involve significantly more audio engineering effort than what the trained style encoder 102 can provide.

Additional applications of the style encoder can extend the same benefits to generation of vocal attributes as well. Simply labeling input audio appropriately gives the SGS, through the style encoder, the ability to reproduce the stylistic elements of the speech, explicitly disentangled from speaker identity and other characteristics.

An Alternative Approach

In some embodiments, a style encoder can be trained without enforcing any disentanglement in the style vectors. Some characteristics and their corresponding dimensions and directions of influence in the style fingerprints can, nonetheless, be determined. For example, given two sets of positive and negative audio samples for a characteristic (e.g., "whisper" versus "shout"), entangled style fingerprints for the samples can be generated. Next, it can be determined, which dimensions or regions of the style vectors resulting from each set show variation, or substantial variation when compared to each other and in which direction they vary. The comparison between style vectors from the positive and negative sets can identify regions corresponding to the characteristic in the positive and the negative set, as well as the direction of influence for the region. Direction of influence refers to the direction of change in values (e.g., increasing them or decreasing them), that results in more or less of that characteristic in a speech generated from the style vector. The direction of influence can identify how to manipulate the characteristic in the style vector, so the generated speech based on the style vector reflects the selected amount and/or quality of the modified style vector. Furthermore, the identified direction of influence and region of encoding of a characteristic can be used for vector operations, such as vector addition/subtraction to generate various style vectors. For example, the centroid of "shouting" style vectors can be subtracted from the centroid of "whisper" style vectors, yielding a "shout" style vector that can be added to other style vectors. Multipliers in combination with the style vector can also be used to control the intensity of the characteristic in speech generated from the modified style vector.

Speech Generation System With Style Conditioning

Figure 10:
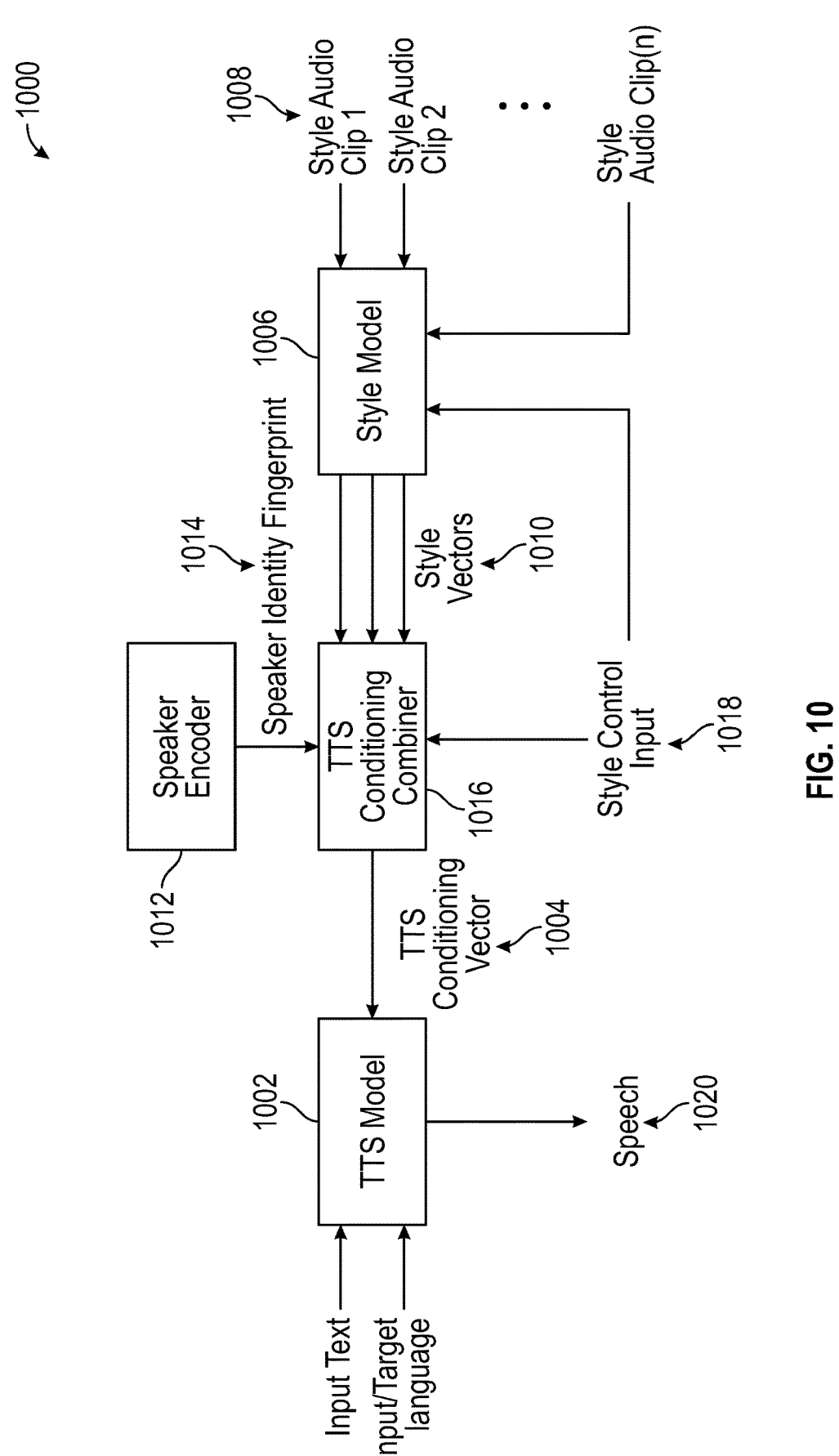
FIG. 10 illustrates a diagram of a speech generation system (SGS), according to an embodiment.

FIG. 10 illustrates a diagram of a speech generation system (SGS) 1000, where both speaker identity and style characteristics can be used to generate artificial speech. The SGS 1000 can include a text to speech (TTS) model 1002. Once trained, the TTS model 1002 can receive an input text, for example, in the form of a transcript and/or a text file, and a conditioning vector 1004. The conditioning vector 1004 can include both speaker identity and style characteristics. The TTS model 1002 can generate speech 1020 from the input text, based on both the speaker identity and the style characteristics, embedded in the TTS conditioning vector 1004. A style model 1006 can be trained, and once trained, it can receive sample style audio clips 1008 and encode the styles of the style audio clips 1008 in one or more style vectors 1010.

A speaker encoder 1012 can provide a speaker identity fingerprint 1014 to a TTS conditioning combiner 1016. The combiner 1016 can concatenate the style vector(s) 1010 with the speaker identity fingerprint 1014, based on a style control input 1018. In some embodiments, the style control input 1018 can be an input received from a user of the SGS 1000, or it can be derived from an input from a user of the SGS 1000. For example, the user can specify the speech 1020 to be generated using speaker A's identity, spoken in a "soft," and "friendly" tone, in a "small room." In this scenario, the speaker encoder 1012 can generate the speaker identity fingerprint 1014 of the speaker A. The style model 1006 can generate the style vector(s) for "soft," "friendly," and "small room." The TTS conditioning vector 1004, in this example, contains both speaker identity fingerprint 1014 of the speaker A and the style characteristics for "soft," "friendly," and speech spoken in a "small room." The TTS model 1002 can use the TTS conditioning vector 1004 to generate the speech as specified by the user.

In some embodiments, the style model 1006 can generate one style vector 1010 with different regions, encoded with different style characteristics. For example, the style vector 1010 can be a vector of dimensions 512, where cells 1-10 encode for "loudness," 11-60 encode for "emotions," 61-120 encode for "room tone," and/or "environmental characteristics," and the remaining dimensions encode for other style characteristics. Further, divisions within each region can also exist. For example, the region encoding emotions can include distinct emotions, such as "content," "happy," "excited," "irritated," and/or other emotions. In some embodiments, the style control input 1018 can alternatively, or additionally be provided to the style model 1006, where the style model 1006 can use the style control input 1018 to build a style vector 1010, as specified by the style control input 1018.

In some embodiments, the style control input 1018 is optional, and no additional input from a human user may be used. In some embodiments, the TTS model 1002 can receive an input/target language parameter, where the TTS model 1002 can generate speech in the language specified in the input/target language parameter. In this scenario, other components (not shown) can provide translation of the input text into a target language. In some embodiments, the speaker encoder 1012 can be eliminated, where the SGS 1000 receives a speaker identity fingerprint 1014 from an external source, as opposed to internally generating it, by using a speaker encoder 1012.

An advantage of the SGS 1000 is that it can provide separate controls, not only between the speaker identity, and various style characteristics, but also separate controls for and between each of the style characteristics. The SGS 1000 can generate style vectors 1010, where selected regions of a style vector 1010 or a combined TTS conditioning vector 1004 can include encodings for a corresponding selected audio characteristic. Consequently, style vectors 1010 can be spliced together to generate new style vectors. For example, the user of the SGS 1000 can request and receive a speech 1020 generated with the identity of speaker "A," emotions of a first style audio clip 1008, the room or environment characteristics from a second style audio clip 1008, and prosody characteristics from a third style audio clip 1008.

Style Vector Operations

Vector operations such as addition, subtraction and multiplication can be used to isolate an audio characteristic of interest, amplify and/or suppress an audio characteristic of interest. In some examples, style vector operations can be used to generate additional style vectors from the existing style vectors 1010. For example, if a first and second audio clips are identical in all respects, but differ in the level of "anger" expressed in each audio clip, the style vectors 1010 generated from them can be subtracted from one another to yield a difference vector. The difference vector, in this example, isolates the emotion of "anger" in a style vector 1010. In other words, the difference vector in this case encodes for the emotion of "anger." The "anger" style vector 1010 can be combined with a speaker identity fingerprint 1014 to generate a TTS conditioning vector 1004. In this example, the TTS model 1002, when conditioned and/or constrained by the TTS conditioning vector 1004 would generate "angry" speech 1020 for the speaker identity encoded in the speaker identity fingerprint 1014.

Another example, where vector operations with style vectors can be helpful to a user includes extracting a preferred style vector from an audio clip whose style characteristics the user prefers and adding the preferred style vector to other style vectors to generate speech that contains the preferred audio characteristics. In another example, if a preferred style vector corresponds to preferred audio characteristics, with one or more undesired audio characteristics, the style vectors corresponding to the undesired audio characteristics can be subtracted from the preferred style vector to eliminate or reduce the undesired audio characteristics.

The examples of vector operations described above are not the only usage of the controllability and customization options the described style vectors provide. Additional examples are provided throughout this disclosure and/or can be realized by a person of ordinary skill in the art given the benefit of the described embodiments.

Style Vector Controllability

An advantage of building style vectors 1010 and the TTS conditioning vector 1004, using the described embodiments is that the style vectors 1010 and the TTS conditioning vector 1004 can include independent and discreet style and/or environment regions and a speaker identity region. The values in the style and/or environment regions of the TTS conditioning vector 1004 can be used to influence the generated speech 1020. In other words, the SGS 1000 can include the correspondence between a style/environment region of the conditioning vector 1004 and the generated speech 1020. The correspondence can include the location of the values in the style vectors 1010 and the TTS conditioning vector 1004 that can affect the generated speech 1020, in terms of an audio characteristic, and also the directionality of the change in values in relation to the effect of the change on the generated speech 1020.

Figure 11:
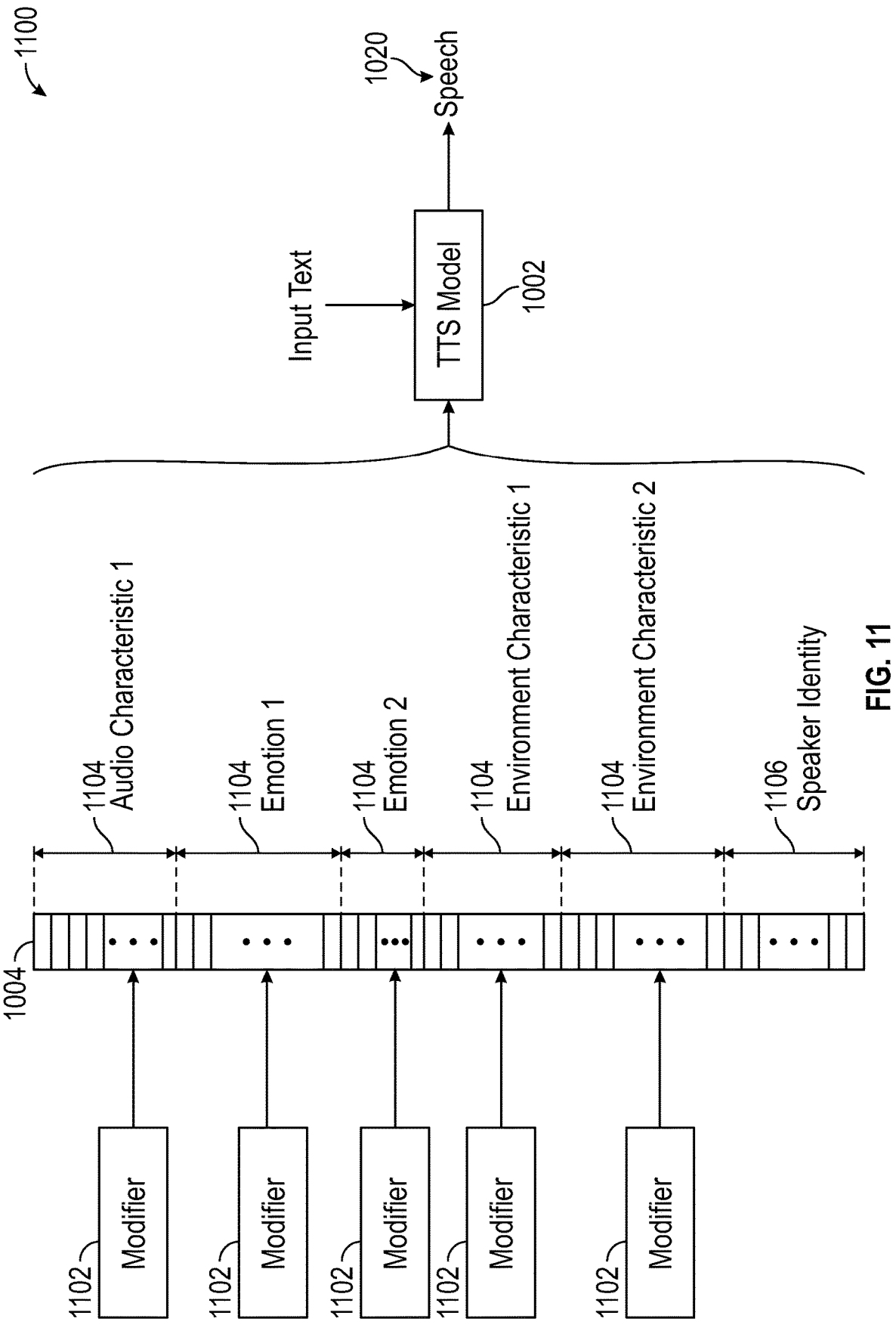
FIG. 11 illustrates an example environment of a conditioning vector.

FIG. 11 illustrates an example environment 1100 of a TTS conditioning vector 1004, where the distinct style regions of the TTS conditioning vector 1004 can be used to change various audio characteristics of the generated speech 1020. The TTS conditioning vector 1004 can include multiple distinct regions 1104, where the style model 1006 has encoded various audio characteristics. The TTS conditioning vector 1004 can also include a speaker identity region 1106, which includes values encoding the identity of a speaker, such that the generated speech 1020, based on the speaker identity encoded in the region 1106 would be recognizable as the speaker's speech. The speaker identity region 1106 can be generated from the speaker identity fingerprint 1014, or can be derived from it.

In some embodiments, each region 1104 is encoded with a selected audio characteristic, for example, "loudness," a particular emotion, an environmental audio characteristic, or other audio characteristics. Modifiers 1102 can be used to change the values in the regions 1104. The changes in the regions 1104 affect how the TTS model 1002 generates the speech 1020. In some embodiments, the modifiers 1102 can be coupled to user interface elements, such as control knobs, switches, sliders, or other user-friendly elements to capture one or more user selections in relation to a change in an audio characteristic. The modifiers 1102 can also be coupled to components or systems that extract a selection or choice of modification in an audio characteristic, not directly based on a user input, but derived from a user input or a collection of historic user inputs. For example, in some embodiments, the SGS 1000 can track a history of user selections, and build user profiles and user preferences of audio styles and audio characteristics, which can become input to the modifiers 1102. In some embodiments, the modifiers 1102 can be combined into one modifier component 1102. The modifiers 1102 can freeze or lock some regions 1104, enter a direct or derived value from a user input into some regions 1104, while simultaneously randomizing some regions 1104. In the field of audio production, the user may not always know what values or amount of a particular emotion, style or audio characteristic may be desirable for a particular speech generation project. In other words, the user may not always desire to or be able to provide a direct input or directive regarding a style or an audio characteristic. In those scenarios, the SGS 1000 can randomly generate various style vectors corresponding to regions 1104 and present the user with multiple speech 1020 samples, generated based on the style vectors. The user can make a selection. The user selection can be tracked in terms of building a library or profile of user preferences for other projects.

In some embodiments, the user can provide one or more sample audio clips as input, instead of or in combination with providing a direct input regarding a selection of an audio characteristic in the generated speech 1020. The user can provide a direct input to the SGS 1000 in the form of selecting an emotion or an environment via a user interface element, such as commanding the SGS 1000 to generate the speech 1020 with a speaker identity and with the emotion of "happy." The user can also provide a sample style audio clip to the SGS 1000, without having to explicitly label or select the style or styles embedded in the sample audio clip, via a user interface. The ability to provide voice, speech or sound inputs, as well as labeled user interface inputs, free the user of the SGS 1000 to obtain more tailored and improved outputs from the SGS 1000.

Furthermore, the modifiers 1102 can be used to amplify or suppress a particular audio characteristic. For example, the emotion of "anger" or the audio characteristic of "loudness" in a generated speech 1020 can be increased or decreased by receiving an intuitive input from the user. For example, the user can turn a user interface (UI) element in the shape of a volume knob to amplify or suppress a style or an audio characteristic in the generated speech 1020. The UI element can be coupled to a modifier 1102, where the modifier translates the user input to corresponding changes in values of a region 1104 and modifies the region 1104 according to the user input. In other words, the modifiers 1102 can receive and convert the user input and modify the values in the audio characteristic regions 1104 in the direction and amount corresponding to the user input. The TTS model 1002 receives the modified TTS conditioning vector 1004 and generates speech 1020 accordingly.

The TTS conditioning vector 1004 constructed with discrete style regions can provide the user of the SGS 1000 unlimited flexibility in customizing the generated speech 1020. For example, the user can provide sample style audio clips to be the basis of the style in the generated speech 1020, or use a random generation function of the SGS 1000. Some examples include, providing audio clips of a speaker to be the basis of the style and speaker identity of the generated speech 1020, while the SGS 1000 randomly generates the speech 1020 with various "room" tones. In other words, the generated speech 1020 can sound like the speaker and have the style of the speaker provided in the sample audio clips, but spoken in different rooms (e.g., "small," "large," "with reverb," "auditorium," "outdoor," etc.). The user can also freeze certain audio characteristics in the TTS conditioning vector 1004 and vary the rest. For example, room tone can be frozen, while emotions can be varied or vice versa. Freezing can be accomplished by freezing the values corresponding to a selected audio characteristic in the TTS conditioning vector 1004. Varying can be accomplished by manipulating the values of the selected regions 1104 in the TTS conditioning vector 1004 via a user input or randomly.

Audio characteristics can also be "overwritten," referring to replacing an audio characteristic in a region with a different audio characteristic, related to or unrelated to the audio characteristic being overwritten. For example, the user can specify an audio characteristic to be overwritten, while specifying that the remaining audio characteristics of the generated speech are to be maintained the same as an input audio sample. For example, the user can provide an audio clip, where the speaker is speaking in a "pensive," or "sad" tone, along with instructions to maintain every style in the generated speech 1020, but change the "pensive" or "sad" tone to "happy," and "cheerful." The SGS 1000 can freeze every 1104 region, except the region 1104 corresponding to the "pensive," or "sad" tone. The region 1104, corresponding to "pensive," or "sad" tone can be replaced with values corresponding to "happy," or "cheerful," resulting in the generated speech 1020 to have speech with the same speaker identity and style, as the sample provided by the user, but spoken in a "happy" or "cheerful" tone.

Furthermore, the SGS 1000 can track user preferences regarding generated speech 1020 over multiple audio projects to build one or more preferred style vectors. For example, the user can make a selection of a preferred generated speech 1020 at the end of an audio project. Such user selections accumulated over some number of audio production projects can be used to construct a profile of user preferences, alleviating the user to manually make selections for every audio project, enabling the user to perform batch editing or efficient speech generation by applying a previous style vector preference. In some embodiments, the style vectors corresponding to user preferred generated speech clips, produced in prior projects can be stored and applied to future audio projects, generating speech with the stored preferred style vectors.

FIG. 12 illustrates a flowchart of a method 1200 for generating speech with a modified TTS conditioning vector, based on a modification selection regarding one or more audio characteristics. The method starts at step 1202. At step 1204, style vectors 1010 can be generated with a style model 1006. The style model 1006 can receive style audio clips 1008 and generate the style vectors 1010. The Style vectors 1010 can encode for various audio characteristics, including, for example, styles, emotions, and environments of speech embedded or contained in the style audio clips 1008. In some embodiments, each style vector 1010 is encoded with a style in a corresponding audio clip 1008 containing that style. In some embodiments, there can be some overlap between the styles encoded in the style vectors 1010, depending on the degree of overlap between the styles in the audio clips 10-8, used to perform the encoding. In some embodiments, the style model 1006 can generate one style vector 1010, based on the style audio clips 1008, where selected regions of the style vector 1010 encode for distinct audio characteristics.

At step 1206, the TTS conditioning combiner 1016 can generate a TTS conditioning vector 1004 by concatenating one or more style vectors 1010 to a speaker identity fingerprint 1014. In this manner, the TTS conditioning vector 1004 can include distinct audio characteristic regions 1104, and the speaker identity region 1106.

At step 1208, the SGS 100 can receive one or more modification selections regarding a selected one or more of the audio characteristics encoded in the TTS conditioning vector 1004. The modification selection can be a direct user input, or be based on one or more user inputs, or generated automatically. While the user input can include a selection of an audio characteristic to modify in the generated speech 1020, the user input can also be in the form of one or more voice, speech, or audio clips containing the styles the user wishes to see in the generated speech 1020. In other words, the user does not necessarily need to be able to name or label the style or input an intensity or level of the style in order to replicate a style and/or intensity of the style in generated speech 1020. Instead, the user can provide the SGS 1000 with sample audio clips as input and direct the SGS 1000 to replicate the styles in the sample audio clips in the generated speech. In other embodiments, the user can select various styles and audio characteristics directly via user interface elements. In other embodiments, the user can rely on the SGS 1000 to provide the modification selection, for example randomly, and present the user with various potential options for generated speech 1020.

The SGS 1000 can determine which audio characteristic regions 1104 correspond to the modification selection. At step 1210, the SGS 1000 can deploy the modifiers 1102 to modify the values in applicable audio characteristic regions 1104 corresponding to and according to the modification selection. For example, the modification selection can include a user input with a selection of an audio characteristic to be modified, such as a style, or an emotion, and a selection to increase the intensity of that style or emotion in the generated speech 1020. The modifiers 1102 can modify the values of an audio characteristic region 1104 corresponding to that style or emotion, based on the user input. At step

1212, the TTS model 1002 can receive an input text, the modified conditioning vector 1004, and generate the speech 1020 conditioned and/or constrained by the modified conditioning vector 1004. The method ends at step 1214.

While some embodiments are described in terms of the style vectors and the TTS conditioning vector 1004 having "distinct" or "discrete" regions corresponding to selected audio characteristics, the audio styles or characteristics, and their corresponding regions in the style vectors or the TTS conditioning vector 1004, need not be necessarily independent. For example, the audio characteristics "loudness," and "anger" may not always be independent. An audio clip that is "loud" can also sometimes contain "angry" speech, and vice versa. Consequently, while the style vectors and the distinct audio characteristic regions in the TTS conditioning vector 1004 can correspond to independent audio styles and/or characteristics, they can also correspond to overlapping and dependent, or interrelated audio styles and/or characteristics. One method by which the dependence between interrelated audio characteristics can be captured in the style vectors 1010 and the TTS conditioning vector 1004 is to designate overlapping regions in the style vectors, so the style model 1006 learns to encode the shared characteristics in the overlapping regions. For example, the dimensions 1-16 in a style vector can be designated for encoding the emotion of "anger," and the dimensions 12-24 can be designated for encoding the emotion of "loudness." Consequently, the style model 1006 learns to encode information that is relevant to both interrelated audio characteristics (in this example "anger," and "loudness") into the overlapping or shared dimensions 12-16. In the scenario where shared overlapping dimensions between style vectors are used, the modifiers 1102 can also become interrelated, or linked, where a modification initiated by one modifier 1102 can affect another modifier 1102.

Direct Concatenation

The TTS conditioning vector 1004 can also be generated by directly concatenating vectors of audio characteristics to selected regions of the TTS conditioning vector 1004. In other words, while the audio characteristics regions 1104 can be populated by style vectors 1010 generated by a style model 1006, an audio characteristic region 1104 can also be directly populated with data or values corresponding to an audio characteristic derived from other sources (e.g., other models). A mix approach can also be used, where some audio characteristic regions 1104 are populated with values generated by the style model 1006, while other audio characteristic regions 1104 are directly populated with audio characteristic values from other sources. The direct concatenation audio characteristic regions 1104 can be trained during the training of the TTS model 1002, using labeled audio samples corresponding to the audio characteristics that were directly concatenated into the TTS conditioning vector 1004. Semi supervised approaches can also be used to train the TTS model 1002 to use the direct concatenated audio characteristic regions 1104. Some examples of the directly concatenated audio characteristics includes, audio characteristics that can be expressed as being present or absent in an audio clip (e.g., "male," or "female"), or audio characteristic that can be expressed, not only in terms of their presence in an audio clip, but also in terms of their intensity (e.g., "loudness").

Switch Dimensions

Concatenating style vectors 1010 into the TTS conditioning vector 1004 can enable control over the style and audio characteristics of the generated speech 1020 produced by the TTS model 1002. In other words, The TTS model 1002 can be provided with a target style or target audio characteristic, via the style vectors 1010, within which it can generate the speech 1020. Without the constraints of the style vectors 1010 in the TTS conditioning vector 1004, the TTS model 1002 would generate the speech 1020 with random and diverse variations in style and/or audio characteristics, albeit constrained by other parameters such as speaker identity and the input text. Such variety and diversity can be desirable in some applications. For example, for some audio characteristics and parameters related to speech generation, concrete or readily available reference training samples may not be available to generate corresponding style vectors 1010. In other applications, it may be desirable to leave the generation of some styles and audio characteristics to the TTS model 1002, without influence from a reference or style vector 1010. In some applications, timing parameters, including, for example, when to insert a pause, or how long a generated utterance should be, may be among the speech generation parameters selected to be left to the TTS model 1002 to generate without being constrained by a style vector 1010 within the TTS conditioning vector 1004. Consequently, in some applications, it may be selected to allow the TTS model 1002 to randomly generate the speech 1020, constrained only with a selection of the regions of the TTS conditioning vector 1004, and unconstrained by the other dimensions of the TTS conditioning vector 1004.

If no style vectors 1010 are added or incorporated in the TTS conditioning vector 1004, the TTS model 1002 can generate the speech 1020, based only on the received input text and the speaker identity fingerprint 1014. Any remaining style and audio characteristics will be randomly generated, with some variety and diversity, by the TTS model 1002, independent of any reference. In some embodiments, the ability of the TTS model 1002 to generate styles and/or audio characteristics, or a selection of styles and audio characteristics, without a reference, and with some variation, can be exploited by a feature of the SGS 100, referred to as "switch dimensions."

When the "switch dimensions" feature is used, the TTS model 1002 is allowed to generate the speech 1020, unconstrained by one or more styles or audio characteristics. These styles or audio characteristics may be encoded in their corresponding regions in the TTS conditioning vector 1004. Nevertheless, when the "switch dimensions" feature is used, these regions are masked or randomized, allowing the TTS model 1002 to still use the TTS conditioning vector 1004, but unconstrained by the masked regions and constrained by the unmasked regions.

Figure 13:
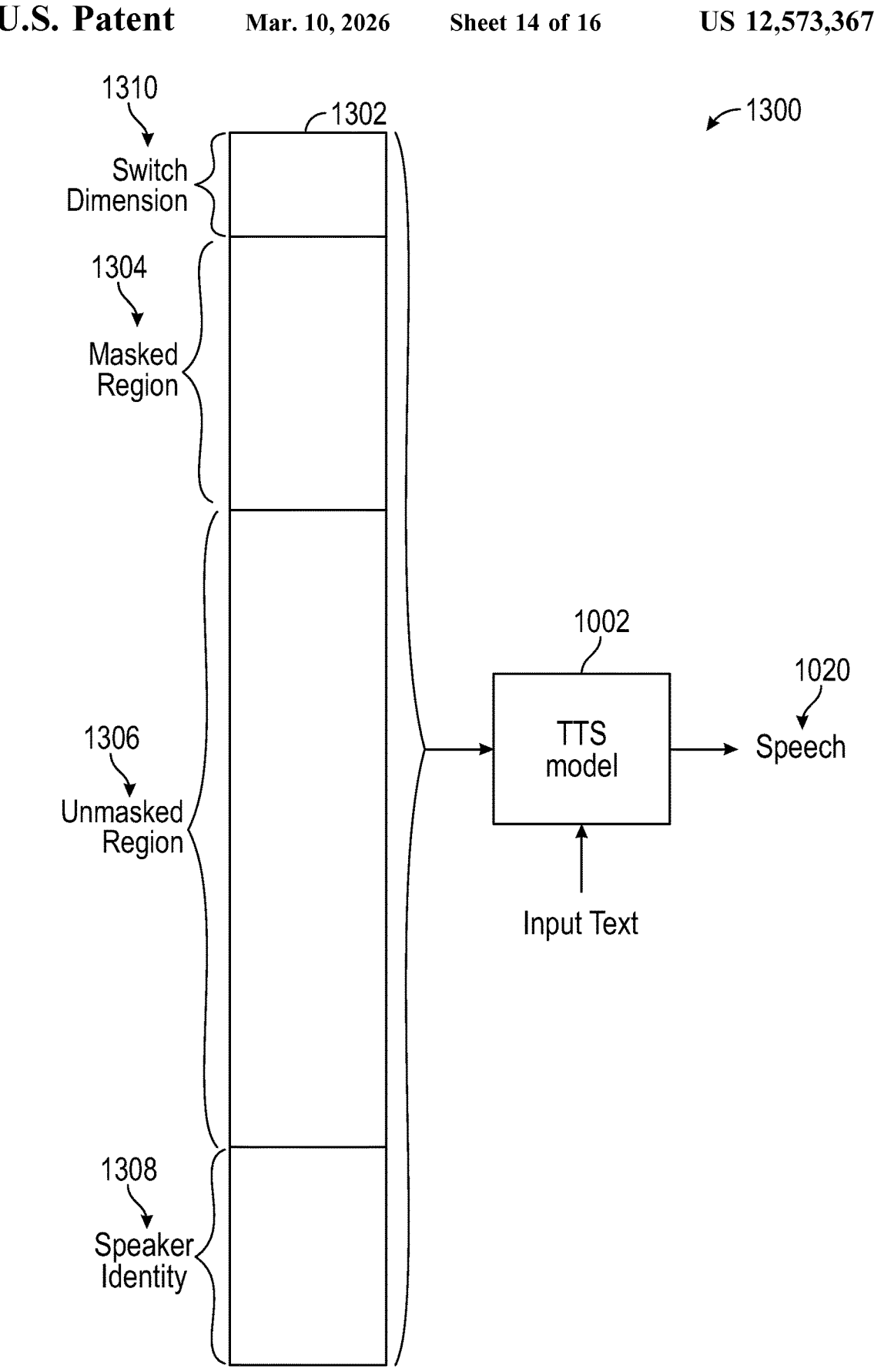
FIG. 13 illustrates a diagram of an example embodiment, where the "switch dimensions" feature is used.

FIG. 13 illustrates a diagram 1300 of an example scenario, where the "switch dimensions" feature is used. A TTS conditioning vector 1302, in this scenario, includes a masked region 1304, an unmasked region 1306, and a speaker identity region 1308. Each masked or unmasked region can include a number of sub regions, where each region corresponds to a distinct and independent audio style, or audio characteristic, encoded by the style model 1006 into style vectors 1010 and combined into the TTS conditioning vector 1004, as described earlier. The TTS model 1002 can generate the speech 1020, unconstrained by the style or styles encoded in the masked region 1304, but constrained by the style or styles encoded in the unmasked region 1306 and with the speaker identity 1308.

To train the TTS model 1002 to generate speech without being constrained by the masked region 1304, a switch dimension 1310 can be added to the TTS conditioning vector 1302. The TTS model 1002 can be trained to ignore the masked region 1304, when the switch dimension value is "ON" (e.g., "1"), or to constrain by it when the switch value is "OFF" (e.g., "0"), when generating the speech 1020. While one switch dimension 1310 and one masked region 1304 are shown, the embodiments are not limited in this manner. Multiple masked regions 1304 and their associated switch dimensions 1310 can be used, where each masked region 1304 can correspond to a selected style or audio characteristic.

The TTS conditioning vector 1302 can be constructed from one or more style vectors 1010 provided by a trained style model 1006. For ease of description, the masked region 1304 can be selected to correspond to one audio style or characteristic. An associated switch dimension 1310 can be added to the TTS conditioning vector 1302. However, more than one masked region 1304 and associated switch dimensions 1310 can be added to the TTS conditioning vector 1302, where each masked region 1304 corresponds to an audio characteristic encoded in that region.

In each training step of the TTS model 1002, a random decision number is selected, for example by randomly selecting a number between "0-1". If the decision number is above a masking threshold (e.g., above "0.7"), the values in the masked region 1304 are replaced with random values or zeros. The value of the switch dimension 1310 is also set to a respective value, depending on whether the masking is performed or not. For example, when the decision number is above the masking threshold, the switch dimension value is set to "ON," (e.g., "1"), indicating the masking is performed. In this manner, in each training step, there is a random chance that a selected region (e.g., the masked region 1304) will be masked. In some embodiments, the masking threshold is a controllable parameter, allowing for selecting how likely it will be that the TTS model 1002 learns speech generation, with a particular region masked. Replacing the masked region 1304 values with random or zero values allows the TTS model 1002 to generate the speech 1020, unconstrained by the values in the masked region 1034. The masked region 1304 corresponds to a selected audio characteristic, which the TTS model 1002 is to generate without referencing any style vectors, corresponding to the masked region 1304. Furthermore, after training the TTS model 1002 learns to pay attention to the values in the masked region 1304, based on whether the switch dimension 1310 value is "ON" or "OFF." Consequently, during the inference operations of the TTS model 1002, a style vector 1010 with an audio characteristic encoded, can be provided to the model and the switch dimensions turned "OFF" to encourage the TTS model 1002 to generate speech 1020, constrained by the provided vector 1010 and the audio characteristic encoded therein. Alternatively, if the TTS model 1002 is to generate the speech 1020, without referencing a style in the style vector 1010 (e.g., either no reference exists, or it is selected that the TTS model 1002 generate the style without a reference), the switch dimension value can be set to "ON" and the masked region 1304 corresponding to the style can be populated with zero or random values.

FIG. 14 illustrates a flowchart 1400 of training a TTS model 1002 to ignore a region of a style vector corresponding to an audio characteristic, based on a "switch dimension" value, and to generate the audio characteristic, without reference to the style vector. The method starts at step 1402. At step 1404, a style vector corresponding to an audio characteristic is received. The style vector can be generated by a trained style model 1006 and can include a plurality of regions, each corresponding to a distinct audio characteristic. At step 1406, a TTS conditioning vector 1004 is generated by concatenating the style vector to a speaker identity fingerprint. At step 1408, a region corresponding to an audio characteristic can be designated as a masked region 1304, and a corresponding switch dimension 1310 can be added to the TTS conditioning vector. At step 1410, during some training steps (randomly chosen), the values in the masked region 1304 can be replaced with random or zero values, and the value of the switch dimension 1310 set accordingly. For example, if during the training step the values of the masked region 1304 were replaced with random or zero values, the switch dimension value is set to ON (e.g., "1"). If during a training step, the values of the masked region 1304 were not replaced, the switch dimension value is set to OFF (e.g., "0"). The method 1400 trains the TTS model 1002 to ignore the values in the masked region 1304, when the switch dimension value is "ON," and to constrain speech generation by the values in the masked region 1304, when the switch dimension is "OFF." The method ends at step 1412.

Additional Usage and Application of the Described Embodiments

In some embodiments, style vectors can be generated, not only from an audio channel of a video clip, but also from visual information in the video clip that can affect, influence, or have an impact on audio. Examples of this visual information can include the type of room, "speech" delivery or components of speech delivery conveyed purely visually, facial expressions, mouth movements, body movements, gestures, or any other visual cues in a video file that can affect audio. In other words, both the video channel and the audio channel of a video clip can be used to generate style vectors. Video channel data can be converted to a format compatible with the encoder 102, and the decoder 104. For example, a compatible transformer 204 can convert the video channel data to a video representation, similar to the audio representation 206. The video representation can then be processed and encoded into a style vector, similar to the audio representation 206, as described above. Therefore, visual information can be extracted from the video channel of a video file and encoded in one or more style vectors. For example, a video clip can include an actor facing another actor in a particular direction, and delivering a speech, not only in a particular auditory style, but also with a visual style (e.g., some actors or scenes may include actors delivering a speech or speaking a scene in conjunction with a particular style of moving the head, body or arms). To the extent that such visual styles influence how the speech sounds, the described embodiments can capture the visual styles, quantify them and encode them into style vectors. In other words, while the style vectors can encode for audio characteristics, they can also encode visual characteristics that can influence an auditory experience of a listener.

Additional examples of visual characteristics that can influence the auditory experience can include the distance and/or orientation of a speaker/actor relative to other speakers or actors or obstacles in a room, or any other visual characteristics of the speaker or the environment, which can impact how speech sounds. The style vectors encoded with visual information can be used alone or in combination with style vectors encoding speech information and speech styles to generate an improved version of speech more closely matching a speaker or selected style (visual or auditory).

Another application of the described technology is in voice-over systems, in particular, text to speech (TTS) voice-over systems that can provide customization to their users. For example, a TTS voice-over system can be conditioned, on video and/or speech style vectors, as described above to automatically choose between a documentary-style narration, a sports-commentator-style narration, or other styles of speech delivery.

In some applications, the described embodiments, both speech and visual style vectors can be used to condition and deploy automated background sound/music, or foley sound generation systems in an audio production pipeline.

Furthermore, artificial intelligence video editing systems that aim to alter video for the purpose of matching facial expressions or movements to speech can benefit from a joint or additional conditioning vector that includes the described speech and/or visual style vectors. Facial expressions generated based on the described style vectors can better match the generated speech and style of a speaker and produce improved results.

Example Implementation Mechanism—Hardware Overview

Some embodiments are implemented by a computer system or a network of computer systems. A computer system may include a processor, a memory, and a non-transitory computer-readable medium. The memory and non-transitory medium may store instructions for performing methods, steps and techniques described herein.

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be server computers, cloud computing computers, desktop computer systems, portable computer systems, handheld devices, networking devices or any other device that incorporates hard-wired and/or program logic to implement the techniques.

Figure 15:
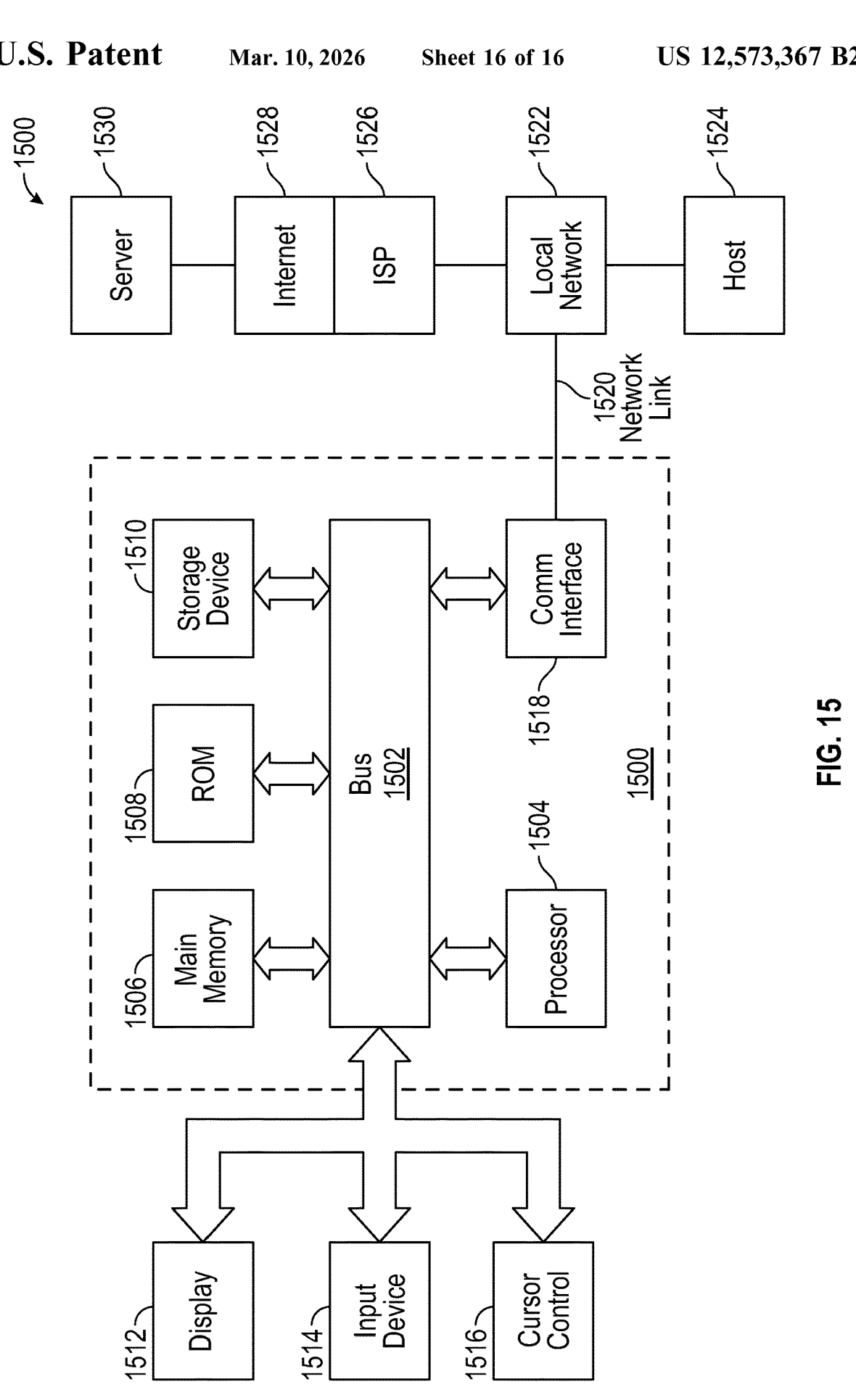
FIG. 15 illustrates a diagram of an environment in which some embodiments can be implemented.

For example, FIG. 15 is a block diagram that illustrates a computer system 1500 upon which an embodiment of can be implemented. Computer system 1500 includes a bus 1502 or other communication mechanism for communicating information, and a hardware processor 1504 coupled with bus 1502 for processing information. Hardware processor 1504 may be, for example, special-purpose microprocessor optimized for handling audio and video streams generated, transmitted or received in video conferencing architectures.

Computer system 1500 also includes a main memory 1506, such as a random access memory (RAM) or other dynamic storage device, coupled to bus 1502 for storing information and instructions to be executed by processor 1504. Main memory 1506 also may be used for storing temporary variables or other intermediate information during execution of instructions to be executed by processor 1504. Such instructions, when stored in non-transitory storage media accessible to processor 1504, render computer system 1500 into a special-purpose machine that is customized to perform the operations specified in the instructions.

Computer system 1500 further includes a read only memory (ROM) 1508 or other static storage device coupled to bus 1502 for storing static information and instructions for processor 1504. A storage device 1510, such as a magnetic disk, optical disk, or solid state disk is provided and coupled to bus 1502 for storing information and instructions.

Computer system 1500 may be coupled via bus 1502 to a display 1512, such as a cathode ray tube (CRT), liquid crystal display (LCD), organic light-emitting diode (OLED), or a touchscreen for displaying information to a computer user. An input device 1514, including alphanumeric and other keys (e.g., in a touch screen display) is coupled to bus 1502 for communicating information and command selections to processor 1504. Another type of user input device is cursor control 1516, such as a mouse, a trackball, or cursor direction keys for communicating direction information and command selections to processor 1504 and for controlling cursor movement on display 1512. This input device typically has two degrees of freedom in two axes, a first axis (e.g., x) and a second axis (e.g., y), that allows the device to specify positions in a plane. In some embodiments, the user input device 1514 and/or the cursor control 1516 can be implemented in the display 1512 for example, via a touchscreen interface that serves as both output display and input device.

Computer system 1500 may implement the techniques described herein using customized hard-wired logic, one or more ASICs or FPGAs, firmware and/or program logic which in combination with the computer system causes or programs computer system 1500 to be a special-purpose machine. According to one embodiment, the techniques herein are performed by computer system 1500 in response to processor 1504 executing one or more sequences of one or more instructions contained in main memory 1506. Such instructions may be read into main memory 1506 from another storage medium, such as storage device 1510. Execution of the sequences of instructions contained in main memory 1506 causes processor 1504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical, magnetic, and/or solid-state disks, such as storage device 1510. Volatile media includes dynamic memory, such as main memory 1506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1502. Transmission media can also take the form of acoustic or light waves, such as those generated during radio-wave and infra-red data communications.

Various forms of media may be involved in carrying one or more sequences of one or more instructions to processor 1504 for execution. For example, the instructions may initially be carried on a magnetic disk or solid state drive of a remote computer. The remote computer can load the instructions into its dynamic memory and send the instructions over a telephone line using a modem. A modem local to computer system 1500 can receive the data on the telephone line and use an infra-red transmitter to convert the data to an infra-red signal. An infra-red detector can receive the data carried in the infra-red signal and appropriate circuitry can place the data on bus 1502. Bus 1502 carries the data to main memory 1506, from which processor 1504 retrieves and executes the instructions. The instructions received by main memory 1506 may optionally be stored on storage device 1510 either before or after execution by processor 1504.

Computer system 1500 also includes a communication interface 1518 coupled to bus 1502. Communication interface 1518 provides a two-way data communication coupling to a network link 1520 that is connected to a local network 1522. For example, communication interface 1518 may be an integrated services digital network (ISDN) card, cable modem, satellite modem, or a modem to provide a data communication connection to a corresponding type of telephone line. As another example, communication interface 1518 may be a local area network (LAN) card to provide a data communication connection to a compatible LAN. Wireless links may also be implemented. In any such implementation, communication interface 1518 sends and receives electrical, electromagnetic or optical signals that carry digital data streams representing various types of information.

Network link 1520 typically provides data communication through one or more networks to other data devices. For example, network link 1520 may provide a connection through local network 1522 to a host computer 1524 or to data equipment operated by an Internet Service Provider (ISP) 1526. ISP 1526 in turn provides data communication services through the worldwide packet data communication network now commonly referred to as the "Internet" 1528. Local network 1522 and Internet 1528 both use electrical, electromagnetic or optical signals that carry digital data streams. The signals through the various networks and the signals on network link 1520 and through communication interface 1518, which carry the digital data to and from computer system 1500, are example forms of transmission media.

Computer system 1500 can send messages and receive data, including program code, through the network(s), network link 1520 and communication interface 1518. In the Internet example, a server 1530 might transmit a requested code for an application program through Internet 1528, ISP 1526, local network 1522 and communication interface 1518. The received code may be executed by processor 1504 as it is received, and/or stored in storage device 1510, or other non-volatile storage for later execution.

EXAMPLES

It will be appreciated that the present disclosure may include any one and up to all of the following examples.

Example 1: A method comprising: receiving a speaker identity fingerprint; training a style model to receive one or more style audio clips and encode one or more audio style characteristics from the received style audio clips into one or more corresponding style regions in a style vector, wherein each style region in the style vector corresponds to an encoded audio style characteristic; generating a conditioning vector by combining the speaker identity fingerprint and the style vector; and training a text to speech (TTS) model with the conditioning vector to receive input text and generate speech, based on the input text, with identity of the speaker encoded in the speaker identity fingerprint, and with one or more style characteristics encoded in the style vector.

Example 2: The method of Example 1 further comprising: training a speaker encoder model to generate the speaker identity fingerprint.

Example 3: The method of some or all of Examples 1 and 2 further comprising: generating a plurality of style vectors; and combining the plurality of the style vectors.

Example 4: The method of some or all of Examples 1-3, further comprising: generating and/or receiving one or more style vectors, wherein the style vectors share some audio characteristics and differ in other audio characteristics; and generating a combined style vector by performing vector operations on the style vectors, wherein the vector operations isolate one or more audio characteristics, wherein the conditioning vector comprises the combined style vector.

Example 5: The method of some or all of Examples 1-4, wherein the training of the TTS model, during a training step further comprises: generating a random decision number; when the random decision number is above a masking threshold, replacing a target region of the conditioning vector with random or zero values; and adding a switch dimension to the conditioning vector, indicating whether the replacing is performed.

Example 6: The method of some or all of Examples 1-5, wherein the style encoded in the style vector comprises audio characteristics of a selected environment.

Example 7: The method of some or all of Examples 1-6, wherein the trained style model and the trained TTS model are used for inference.

Example 8: The method of some or all of Examples 1-7, wherein the trained style model and the trained TTS model are used in inference, comprising: receiving one or more inference style audio clips from a user; generating an inference style vector, with the trained style model receiving the inference style audio clips as input; and generating inference speech, with the trained TTS model conditioned on the inference style audio vector.

Example 9: The method of some or all of Examples 1-8, wherein the trained style model and the trained TTS model are used in inference, comprising: generating an inference style vector; receiving a selection of an audio characteristic to maintain; and randomizing values in a region of the style vector corresponding to the received selection of the audio characteristic while freezing values in other regions of the style vector.

Example 10: The method of some or all of Examples 1-9, further comprising: generating a plurality of speech clips with the trained TTS model; receiving a plurality of user selections of preferred generated speech clips; determining preferred style vectors corresponding to the user-preferred generated speech clips; and generating, with the trained TTS, speech clips, based at least in part on the user-preferred style vectors.

Example 11: The method of some or all of Examples 1-10, further comprising: receiving a modification selection regarding an audio characteristic; determining a region of the style vector corresponding to the audio characteristic; and modifying values in the determined region, based at least in part on the received modification selection.

Example 12: A non-transitory computer storage medium that stores executable program instructions that, when executed by one or more computing devices, configure the one or more computing devices to perform operations comprising: receiving a speaker identity fingerprint; training a style model to receive one or more style audio clips and encode one or more audio style characteristics from the received style audio clips into one or more corresponding style regions in a style vector, wherein each style region in the style vector corresponds to an encoded audio style characteristic; generating a conditioning vector by combining the speaker identity fingerprint and the style vector; and training a text to speech (TTS) model with the conditioning vector to receive input text and generate speech, based on the input text, with identity of the speaker encoded in the speaker identity fingerprint, and with one or more style characteristics encoded in the style vector.

Example 13: The non-transitory computer storage medium of Example 12, wherein the operations further comprise: training a speaker encoder model to generate the speaker identity fingerprint.

Example 14: The non-transitory computer storage medium of some or all of Examples 12 and 13, wherein the operations further comprise: generating a plurality of style vectors; and combining the plurality of the style vectors.

Example 15: The non-transitory computer storage medium of some or all of Examples 12-14, wherein the operations further comprise: generating and/or receiving one or more style vectors, wherein the style vectors share some audio characteristics and differ in other audio characteristics; and generating a combined style vector by performing vector operations on the style vectors, wherein the vector operations isolate one or more audio characteristics, wherein the conditioning vector comprises the combined style vector.

Example 16: The non-transitory computer storage medium of some or all of Examples 12-15, wherein the operations during a training step of the TTS model, further comprises: generating a random decision number; when the random decision number is above a masking threshold, replacing a target region of the conditioning vector with random or zero values; and adding a switch dimension to the conditioning vector, indicating whether the replacing is performed.

Example 17: The non-transitory computer storage medium of some or all of Examples 12-16, wherein the style encoded in the style vector comprises audio characteristics of a selected environment.

Example 18: The non-transitory computer storage medium of some or all of Examples 12-17, wherein the operations further comprise using the trained style model and the trained TTS model for inference.

Example 19: The non-transitory computer storage medium of some or all of Examples 12-18, wherein the operations further comprise using the trained style model and the trained TTS model in inference, comprising: receiving one or more inference style audio clips from a user; generating an inference style vector, with the trained style model receiving the inference style audio clips as input; and generating inference speech, with the trained TTS model conditioned on the inference style audio vector.

Example 20: The non-transitory computer storage medium of some of all of Examples 12-19, wherein the operations further comprise using the trained style model and the trained TTS model in inference, comprising: generating an inference style vector; receiving a selection of an audio characteristic to maintain; and randomizing values in a region of the style vector corresponding to the received selection of the audio characteristic while freezing values in other regions of the style vector.

Example 21: A method comprising: training an encoder, the training comprising: receiving an input audio sample; compressing, with the encoder, the input audio sample into a style vector; receiving one or more exclusionary data vectors; generating a first combined vector by concatenating the style vector with the one or more exclusionary data vectors; decompressing the first combined vector with a decoder; regenerating the input audio sample from the decompressed first combined vector; generating an encoder loss term, based on a comparison of the input audio sample and the regenerated input audio sample; and updating encoder model parameters, based at least in part on the encoder loss term.

Example 22: The method of Example 21, wherein the input audio sample is from a pool of a plurality of audio clips; and training of the encoder further comprises performing the training for multiple batches of input audio samples at a time, wherein the encoder loss term is derived by combining the loss terms for each input audio sample in the batch.

Example 23: The method of some or all of Example 21 and 22, wherein the exclusionary data vectors comprise one or more of a speaker identity fingerprint vector, a text vector and a content vector.

Example 24: The method of some or all of Examples 21-23, further comprising: receiving a pool of input audio samples; designating a positive training dataset and a negative training dataset, the positive training dataset comprising audio samples having a target characteristic, and the negative training dataset comprising audio samples having the opposite of the target characteristic; loading a batch of input audio samples from the pool of audio samples; generating style vectors corresponding to each audio sample in the batch; allocating a target region of the style vectors to encoding of the target characteristic; when at least one audio sample is available from each positive and negative training dataset, determining, within the target region of the style vectors of the opposite training datasets, a mix-set loss term between the opposite set style vectors, and subtracting the mix-set loss term from the encoder loss; and when at least two audio samples are available from same training dataset, determining, within the target region of the style vectors of the same dataset, a positive set and/or a negative set loss term, and adding the positive set and/or the negative set loss term to the encoder loss.

Example 25: The method of some or all of Examples 21-24, wherein designating the training datasets further comprises selecting a range of values for assigning an audio sample to a training dataset.

Example 26: The method of some or all of Examples 21-25, further comprising: receiving at least two training datasets, wherein the training datasets comprise audio samples with variation in a target characteristic and uniform in non-target characteristics; generating style vectors from each audio sample; allocating a target region of the style vectors to encoding of the target characteristic; determining, within the non-target regions of the style vectors, a secondary loss term; and adding the secondary loss term to the encoder loss term.

Example 27: The method of some or all of Examples 21-26, further comprising: receiving a plurality of labeled training audio samples, the labels indicating a target characteristic; generating style vectors from the labeled training audio samples; allocating a target region of the style vectors to encoding of the target characteristic; providing values in the target regions of the style vectors to a classifier; predicting, with the classifier, applicable labels to the values in the target regions; generating a classifier loss term; and adding the classifier loss term to the encoder loss term.

Example 28: The method of some or all of Examples 21-27, further comprising: the trained encoder, generating a style vector; receiving a speaker identity fingerprint vector; combining the style vector with the speaker identity fingerprint vector; and training a text to speech (TTS) model conditioned by the combined vector.

Example 29: A non-transitory computer storage medium that stores executable program instructions that, when executed by one or more computing devices, configure the one or more computing devices to perform operations comprising: training an encoder, the training comprising: receiving an input audio sample; compressing, with the encoder, the input audio sample into a style vector; receiving one or more exclusionary data vectors; generating a first combined vector by concatenating the style vector with the one or more exclusionary data vectors; decompressing the first combined vector with a decoder; regenerating the input audio sample from the decompressed first combined vector; generating an encoder loss term, based on a comparison of the input audio sample and the regenerated input audio sample; and updating encoder model parameters, based at least in part on the encoder loss term.

Example 30: The non-transitory computer storage medium of Example 29, wherein the input audio sample is from a pool of a plurality of audio clips; and training of the encoder further comprises performing the training for multiple batches of input audio samples at a time, wherein the encoder loss term is derived by combining the loss terms for each input audio sample in the batch.

Example 31: The non-transitory computer storage medium of some or all of Examples 29 and 30, wherein the exclusionary data vectors comprise one or more of a speaker identity fingerprint vector, a text vector and a content vector.

Example 32: The non-transitory computer storage medium of some or all of Examples 29-31, wherein the operations further comprise: receiving a pool of input audio samples; designating a positive training dataset and a negative training dataset, the positive training dataset comprising audio samples having a target characteristic, and the negative training dataset comprising audio samples having the opposite of the target characteristic; loading a batch of input audio samples from the pool of audio samples; generating style vectors corresponding to each audio sample in the batch; allocating a target region of the style vectors to encoding of the target characteristic; when at least one audio sample is available from each positive and negative training dataset, determining, within the target region of the style vectors of the opposite training datasets, a mix-set loss term between the opposite set style vectors, and subtracting the mix-set loss term from the encoder loss; and when at least two audio samples are available from same training dataset, determining, within the target region of the style vectors of the same dataset, a positive set and/or a negative set loss term, and adding the positive set and/or the negative set loss term to the encoder loss.

Example 33: The non-transitory computer storage medium of some or all of Examples 29-32, wherein designating the training datasets further comprises selecting a range of values for assigning an audio sample to a training dataset.

Example 34: The non-transitory computer storage medium of some or all of Examples 29-33, wherein the operations further comprise: receiving at least two training datasets, wherein the training datasets comprise audio samples with variation in a target characteristic and uniform in non-target characteristics; generating style vectors from each audio sample; allocating a target region of the style vectors to encoding of the target characteristic; determining, within the non-target regions of the style vectors, a secondary loss term; and adding the secondary loss term to the encoder loss term.

Example 35: The non-transitory computer storage medium of some or all of Examples 29-34, wherein the operations further comprise: receiving a plurality of labeled training audio samples, the labels indicating a target characteristic; generating style vectors from the labeled training audio samples; allocating a target region of the style vectors to encoding of the target characteristic; providing values in the target regions of the style vectors to a classifier; predicting, with the classifier, applicable labels to the values in the target regions; generating a classifier loss term; and adding the classifier loss term to the encoder loss term.

Example 36: The non-transitory computer storage medium of some or all of Examples 29-35, wherein the operations further comprise: the trained encoder, generating a style vector; receiving a speaker identity fingerprint vector; combining the style vector with the speaker identity fingerprint vector; and training a text to speech (TTS) model conditioned by the combined vector.

Example 37: A system comprising a processor, the processor configured to perform operations comprising: training an encoder, the training comprising: receiving an input audio sample; compressing, with the encoder, the input audio sample into a style vector; receiving one or more exclusionary data vectors; generating a first combined vector by concatenating the style vector with the one or more exclusionary data vectors; decompressing the first combined vector with a decoder; regenerating the input audio sample from the decompressed first combined vector; generating an encoder loss term, based on a comparison of the input audio sample and the regenerated input audio sample; and updating encoder model parameters, based at least in part on the encoder loss term.

Example 38: The system of Example 37, wherein the input audio sample is from a pool of a plurality of audio clips; and training of the encoder further comprises performing the training for multiple batches of input audio samples at a time, wherein the encoder loss term is derived by combining the loss terms for each input audio sample in the batch.

Example 39: The system of some or all of Examples 37 and 38, wherein the exclusionary data vectors comprise one or more of a speaker identity fingerprint vector, a text vector and a content vector.

Example 40: The system of some or all of Examples 37-39, wherein the operations further comprise: the trained encoder, generating a style vector; receiving a speaker identity fingerprint vector; combining the style vector with the speaker identity fingerprint vector; and training a text to speech (TTS) model conditioned by the combined vector.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including, hard drives, floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects.

What is claimed is:

1. A method comprising:
receiving a speaker identity fingerprint;
training a style model to receive one or more style audio clips and encode one or more audio style characteristics from the received style audio clips into one or more corresponding style regions in a style vector, wherein each style region in the style vector corresponds to an encoded audio style characteristic;
generating a conditioning vector by combining the speaker identity fingerprint and the style vector; and
training a text to speech (TTS) model with the conditioning vector to receive input text and generate speech, based on the input text, with identity of the speaker encoded in the speaker identity fingerprint, and with one or more style characteristics encoded in the style vector, wherein the training of the TTS model, during a training step further comprises:
generating a random decision number;
when the random decision number is above a masking threshold, replacing a target region of the conditioning vector with random or zero values; and
adding a switch dimension to the conditioning vector, indicating whether the replacing is performed,
wherein the trained style model and the trained TTS model are used in inference, comprising:
receiving one or more inference style audio clips from a user;
generating an inference style vector, with the trained style model receiving the inference style audio clips as input; and
generating inference speech, with the trained TTS model conditioned on the inference style audio vector.

2. The method of claim 1 further comprising:
training a speaker encoder model to generate the speaker identity fingerprint.

3. The method of claim 1 further comprising:
generating a plurality of style vectors; and
combining the plurality of the style vectors.

4. The method of claim 1, further comprising:
generating and/or receiving one or more style vectors, wherein the style vectors share some audio characteristics and differ in other audio characteristics; and
generating a combined style vector by performing vector operations on the style vectors, wherein the vector operations isolate one or more audio characteristics, wherein the conditioning vector comprises the combined style vector.

5. The method of claim 1, wherein the style encoded in the style vector comprises audio characteristics of a selected environment.

6. The method of claim 1, wherein the trained style model and the trained TTS model are used for inference.

7. The method of claim 1, wherein the trained style model and the trained TTS model are used in inference, comprising:
generating an inference style vector;
receiving a selection of an audio characteristic to maintain; and
randomizing values in a region of the style vector corresponding to the received selection of the audio characteristic while freezing values in other regions of the style vector.

8. The method of claim 1, further comprising:
generating a plurality of speech clips with the trained TTS model;
receiving a plurality of user selections of preferred generated speech clips;
determining preferred style vectors corresponding to the user-preferred generated speech clips; and
generating, with the trained TTS, speech clips, based at least in part on the user-preferred style vectors.

9. The method of claim 1, further comprising:
receiving a modification selection regarding an audio characteristic;
determining a region of the style vector corresponding to the audio characteristic; and
modifying values in the determined region, based at least in part on the received modification selection.

10. A non-transitory computer storage medium that stores executable program instructions that, when executed by one or more computing devices, configure the one or more computing devices to perform operations comprising:

receiving a speaker identity fingerprint;

training a style model to receive one or more style audio clips and encode one or more audio style characteristics from the received style audio clips into one or more corresponding style regions in a style vector, wherein each style region in the style vector corresponds to an encoded audio style characteristic;

generating a conditioning vector by combining the speaker identity fingerprint and the style vector; and training a text to speech (TTS) model with the conditioning vector to receive input text and generate speech, based on the input text, with identity of the speaker encoded in the speaker identity fingerprint, and with one or more style characteristics encoded in the style vector, wherein the operations during a training step of the TTS model, further comprises:

generating a random decision number;

when the random decision number is above a masking threshold, replacing a target region of the conditioning vector with random or zero values; and adding a switch dimension to the conditioning vector, indicating whether the replacing is performed, using the trained style model and the trained TTS model in inference, comprising:

receiving one or more inference style audio clips from a user;

generating an inference style vector, with the trained style model receiving the inference style audio clips as input; and generating inference speech, with the trained TTS model conditioned on the inference style audio vector.

11. The non-transitory computer storage medium of claim 10, wherein the operations further comprise:

training a speaker encoder model to generate the speaker identity fingerprint.

12. The non-transitory computer storage medium of claim 10, wherein the operations further comprise:

generating a plurality of style vectors; and combining the plurality of the style vectors.

13. The non-transitory computer storage medium of claim 10, wherein the operations further comprise:

generating and/or receiving one or more style vectors, wherein the style vectors share some audio characteristics and differ in other audio characteristics; and generating a combined style vector by performing vector operations on the style vectors, wherein the vector operations isolate one or more audio characteristics, wherein the conditioning vector comprises the combined style vector.

14. The non-transitory computer storage medium of claim 10, wherein the style encoded in the style vector comprises audio characteristics of a selected environment.

15. The non-transitory computer storage medium of claim 10, wherein the operations further comprise using the trained style model and the trained TTS model for inference.

16. The non-transitory computer storage medium of claim 10, wherein the operations further comprise using the trained style model and the trained TTS model in inference, comprising:

generating an inference style vector;

receiving a selection of an audio characteristic to maintain; and randomizing values in a region of the style vector corresponding to the received selection of the audio characteristic while freezing values in other regions of the style vector.

17. A system comprising one or more processors, wherein the one or more processors are configured to perform operations comprising:

receiving a speaker identity fingerprint;

training a style model to receive one or more style audio clips and encode one or more audio style characteristics from the received style audio clips into one or more corresponding style regions in a style vector, wherein each style region in the style vector corresponds to an encoded audio style characteristic;

generating a conditioning vector by combining the speaker identity fingerprint and the style vector; and training a text to speech (TTS) model with the conditioning vector to receive input text and generate speech, based on the input text, with identity of the speaker encoded in the speaker identity fingerprint, and with one or more style characteristics encoded in the style vector, wherein the training of the TTS model, during a training step further comprises:

generating a random decision number;

when the random decision number is above a masking threshold, replacing a target region of the conditioning vector with random or zero values; and adding a switch dimension to the conditioning vector, indicating whether the replacing is performed, using the trained style model and the trained TTS model in inference, comprising:

receiving one or more inference style audio clips from a user;

generating an inference style vector, with the trained style model receiving the inference style audio clips as input; and generating inference speech, with the trained TTS model conditioned on the inference style audio vector.

18. The system of claim 17, wherein the operations further comprise: training a speaker encoder model to generate the speaker identity fingerprint.

* * * * *